(12) United States Patent
Showalter

(10) Patent No.: US 10,050,925 B1
(45) Date of Patent: Aug. 14, 2018

(54) METHOD AND SYSTEM FOR NOTIFYING USERS OF MISDIRECTED RESPONSE MESSAGES ASSOCIATED WITH MESSAGES SENT ON THE USERS' BEHALF BY AN INTERMEDIARY SERVICE

(71) Applicant: Intuit Inc., Mountain View, CA (US)

(72) Inventor: Jim Showalter, Los Gatos, CA (US)

(73) Assignee: Intuit Inc., Mountain View, CA (US)

( * ) Notice: Subject to any disclaimer, the term of this patent is extended or adjusted under 35 U.S.C. 154(b) by 431 days.

(21) Appl. No.: 14/607,255

(22) Filed: Jan. 28, 2015

(51) Int. Cl.
*H04L 12/58* (2006.01)

(52) U.S. Cl.
CPC .............. *H04L 51/28* (2013.01); *H04L 51/12* (2013.01); *H04L 51/34* (2013.01)

(58) Field of Classification Search
CPC ......... H04L 51/28; H04L 51/34; H04L 51/12; H04L 12/1859; H04L 29/06; H04L 69/329; H04L 9/3271; H04L 63/0407; H04L 67/20; H04L 67/306; H04L 63/0421; H04L 9/3213; G06Q 30/02; G06Q 20/383; G06Q 30/06; G06Q 10/10; G06Q 10/107; G06F 21/31; G06F 21/62; G06F 21/6227; G06F 21/78
USPC ....................................................... 709/206
See application file for complete search history.

(56) References Cited

U.S. PATENT DOCUMENTS

| | | | | |
|---|---|---|---|---|
| 6,061,789 A | * | 5/2000 | Hauser .................. | G06F 21/606 380/255 |
| 6,161,129 A | * | 12/2000 | Rochkind ............ | G06Q 10/107 709/204 |
| 6,591,291 B1 | * | 7/2003 | Gabber ................ | G06Q 10/107 370/393 |
| 7,056,217 B1 | * | 6/2006 | Pelkey .................... | A63F 13/12 463/25 |
| 2001/0047294 A1 | * | 11/2001 | Rothschild ............. | G06Q 30/02 705/14.47 |
| 2003/0153302 A1 | * | 8/2003 | Lewis .................. | G06Q 20/102 455/412.1 |
| 2004/0111478 A1 | * | 6/2004 | Gross ...................... | H04L 51/00 709/206 |
| 2005/0198511 A1 | * | 9/2005 | Tomkow ................ | H04L 51/30 713/176 |
| 2007/0011245 A1 | * | 1/2007 | Kawashima ............ | H04L 51/28 709/206 |

(Continued)

OTHER PUBLICATIONS

Microsoft (Article ID: 195671—Last Review: Sep. 20, 2011 19:47:00—Revision: 8.0).*

*Primary Examiner* — Ninos Donabed
(74) *Attorney, Agent, or Firm* — Hawley Troxell Ennis & Hawley LLP; Philip McKay

(57) ABSTRACT

Messages sent on behalf of a user through an intermediary service message are assigned a unique sender address including unique message identification data unique to each message being sent. The unique sender address further includes message delivery system domain data identifying the actual domain of the intermediary service. The unique message identification data is also mapped to a user routing address. The unique sender address is then used to populate the "From" field of the message. Consequently, any message response sent to the "From" field of the message can be automatically analyzed to identify the user identification data in the unique sender address and automatically mapped to the user notification routing address. A notification of the response message can then be automatically relayed to the user using the user notification routing address.

27 Claims, 7 Drawing Sheets

(56) References Cited

U.S. PATENT DOCUMENTS

| | | | | |
|---|---|---|---|---|
| 2008/0066168 | A1* | 3/2008 | Gregg | G06F 21/335 726/7 |
| 2008/0155035 | A1* | 6/2008 | Reddy | G06Q 10/107 709/206 |
| 2009/0019021 | A1* | 1/2009 | Davies | G06F 17/30616 |
| 2010/0251374 | A1* | 9/2010 | Dill | H04L 12/58 726/25 |
| 2011/0196730 | A1* | 8/2011 | Walker | G06Q 20/20 705/14.25 |
| 2011/0258065 | A1* | 10/2011 | Fordyce, III | G06Q 10/10 705/26.1 |
| 2012/0190325 | A1* | 7/2012 | Abu-Hakima | H04L 12/1845 455/404.2 |
| 2012/0310688 | A1* | 12/2012 | Jackson | G06Q 10/0639 705/7.11 |
| 2013/0070672 | A1* | 3/2013 | McFarland | H04L 65/1069 370/328 |
| 2013/0159836 | A1* | 6/2013 | Ferraro | G06Q 10/00 715/234 |
| 2014/0278783 | A1* | 9/2014 | Du | G06O 30/0203 705/7.32 |
| 2014/0278788 | A1* | 9/2014 | Du | G06O 30/0203 705/7.32 |
| 2015/0006654 | A1* | 1/2015 | Couchon | H04L 51/36 709/206 |
| 2015/0058026 | A1* | 2/2015 | Hoeller | G16H 40/20 705/2 |
| 2016/0021495 | A1* | 1/2016 | Segev | H04W 40/20 455/456.3 |

\* cited by examiner

300

301 — STEVESMITH.1000@MAIL.QBO.INTUIT.COM
　　　　⎵　　　　⎵　　　⎵
　　　　303　　　305　　307

FIG. 3A

309 — STEVESMITH.1000

703 TO: "SALLY JONES <SALLY-JONES12@YAHOO.COM>"
705 FROM: "STEVE SMITH <STEVESMITH.1000@MAIL.QBO.INTUIT.COM>"
707 REPLY TO: "STEVE SMITH <STEVESMITH@GMAIL.COM>"
709 SUBJECT: INVOICE FOR LOCKSMITH SERVICES ON 2/14/2014

803 — 801

DEAR STEVE SMITH,

A MESSAGE HAS BEEN RECEIVED IN RESPONSE TO YOUR MESSAGE "INVOICE FOR LOCKSMITH SERVICES ON 2/14/2014."
YOU CAN ACCESS THIS RECEIVED MESSAGE AT QUICKBOOKS BY CLICKING THIS LINK: ACCESS.MAIL.QBO.INTUIT.COM.

SINCERELY,
QUICKBOOKS

METHOD AND SYSTEM FOR NOTIFYING USERS OF MISDIRECTED RESPONSE MESSAGES ASSOCIATED WITH MESSAGES SENT ON THE USERS' BEHALF BY AN INTERMEDIARY SERVICE

BACKGROUND

Globally, the amount of data exchanged electronically is staggering. For example, by some estimates, over 100 billion business emails are exchanged per day, 50 billion mobile instant messages are exchanged per day, and 8.6 trillion text messages are sent each year. Although much of the exchanged information is legitimate, useful, or at least benign, a great deal of electronic communications contains undesirable, and even malicious, content. Indeed, the vast majority of all transmitted emails are spam. In addition, mobile message spam, e.g., text message spam, is on the rise. As a result of this onslaught of unwanted communication, measures to filter undesirable messages and message content are constantly being developed and refined. Thus, those who generate undesirable messages and message content and those who filter undesirable content are in a constantly evolving arms race.

One means by which undesirable messages and message content is filtered or blocked is by identifying those messages that provide sender address data, e.g. data populating a "From" field that includes data identifying a server, e.g., a web-host domain, that differs from the server/domain from which the message was actually sent. This type of filtering is relatively effective given that many spam messages do indeed include a "From" address that identifies a server/domain that differs from the server/domain from which the message was actually being sent in an effort to hide the source and otherwise mislead the recipient. However, an unintended consequence of this blocking or filtering scheme is that many legitimate messages sent through intermediary services on behalf of users are also blocked.

To understand how this unintended result comes about, it is necessary to first understand how misdirected responses such as notification of delivery anomaly events, e.g. delivery failure events, and misdirected replies are generated and processed. In the event that a message, such as, but not limited to, an email message, cannot be delivered to the designated recipient address, notification of the delivery anomaly event, i.e., delivery anomaly event notification data, is transmitted to the sender address associated with the original message, i.e., the address listed in the "From" field of the original message.

Likewise, even if the message is successfully delivered to the intended recipient, the recipient may reply to the message, e.g., generate a reply message, using the sender address data in the "From" field of the message rather than the address data in the "Reply To" field. Therefore, the reply is misdirected to the sender address data rather than to the address data in the "Reply To" field. For the sake of readability, both delivery anomaly event notifications and misdirected replies will be referred to collectively as misdirected responses.

In the discussion above, sending the notification of the delivery anomaly event to the sender address associated with the original message, i.e., the address listed in the "From" field of the original message, is a viable and efficient procedure if the original message is sent by a single party, e.g., a single user. This is because if the sending party and the user needing to receive the notification of the delivery anomaly event are the same party, then the address of the user and the address listed in the "From" field of the message are the same. Likewise, if the original message is sent by a single party, any reply message sent to the "From" field of the original message is likely to be received by the party. Therefore, the reply message is not likely to be misdirected.

However, it is often the case that a given message is sent on behalf of a user by the intermediary service, such as, but not limited to, tax preparation software systems, financial management systems, and small business management software systems. In these instances, the intermediary service has an associated sender address, which includes intermediary service domain identification data. The sender address associated with the intermediary service is typically different from a user routing address, which includes user domain identification data and is used to route messages and notifications directly to the user. Consequently, when a message is generated and sent through an intermediary service, and/or a message delivery system associated with the intermediary service, if the sender address for the actual sender of the message, i.e., the intermediary service or a message delivery system associated with the intermediary service, is used to populate the "From" field, then any notification for notifying users of misdirected response messages will be routed to the intermediary service, or a message delivery system associated with the intermediary service, and not the user on whose behalf the message was generated and sent. Unfortunately, the user is the party that most likely needs to be notified of any misdirected response directly and as soon as possible so that appropriate action can be taken.

This is a significant problem for both the users of the intermediary services and providers of the intermediary services because while generating and delivering messages for users is an important feature of many intermediary services, those intermediary services are not currently capable of efficiently forwarding notifications of misdirected responses to users in a timely manner. Furthermore, these intermediary services do not have the desire to devote the resources currently required to efficiently and effectively forward notifications of misdirected responses. In short, the intermediary services that provide the message delivery systems and domains typically have no association with the messages sent by their individual users. Consequently, the intermediary services are neither particularly concerned with misdirected responses, nor are they in the best position to deal with the process of notifying users of misdirected response messages. Arguably, however, by sending messages on behalf of their users, the intermediary services accept responsibility for ensuring that their users' messages are successfully delivered, or at least that the user is made aware of any misdirected responses. Despite this responsibility, intermediary services are currently forced to accept some amount of loss associated with misdirected responses. This is a real problem because, in theory, there is no acceptable level of loss associated with misdirected responses. Indeed, bounced and misdirected messages can result in important communications being lost, time squandered, and money wasted.

To solve this problem, many intermediary services began using the user routing address, including user domain identification data, associated with the user to populate the "From" field of messages sent on behalf of the user. Consequently, if the message sent on behalf of the user was subject to a misdirected response, the notification of the misdirected response would be sent to the user routing address, including user domain identification data, in the "From" field of the message rather than to the sender address associated with the intermediary service, or a message delivery system associated with the intermediary service.

The solution described above had the potential to solve the problem related to the notification of a misdirected response. As noted, however, currently deployed spam and malware identification and blocking systems filter, or block, messages whose sender address data, e.g. data populating a "From" field, includes data identifying a server/domain that differs from the server/domain from which the message is actually being sent. Consequently, when the user routing address, including user domain identification data, associated with the user is used to populate the "From" field of messages sent on behalf of the user through the intermediary service, or a message delivery system associated with the intermediary service, and the intermediary service, or a message delivery system associated with the intermediary service, is the actual sending entity with a different address including an intermediary service domain identification data different from the user domain identification data, the message is identified as spam/malware, and is blocked or filtered.

As one specific illustrative example, assume the intermediary service is a financial management service that sends messages containing message data representing invoices on behalf of its users. To pass through the filtering mechanisms described above, the financial management service's message delivery system must provide sender address data that identifies the message delivery system server and/or domain provided by, or associated with, the financial management service. In other words, the sender address data used to populate the "From" field of the message must identify a domain that matches the domain of the financial management service's message delivery system. Therefore, the sender address of the financial management service's message delivery system must be used to populate the "From" field. However, this means that when the financial management service's message delivery system attempts to deliver an invoice on behalf of one of its users but delivery of the message including the invoice fails or some other delivery anomaly event occurs, notification of the delivery anomaly event will be directed to the financial management service's message delivery system server and/or domain rather than the user who wished to send the invoice. Similarly, if the intended recipient of the message and invoice attempts to reply to the message using the sender address data in the "From" field rather than the address in the "Reply To" field, the reply message will be misdirected to the financial management service's server and/or domain rather than to the user who is the actual intended recipient. In both these scenarios, the user would remain ignorant of the delivery anomaly event, misdirected reply, or any other response directed to the sender address.

As discussed above, despite numerous historical efforts to solve it, the long standing problem of ensuring that notification of misdirected responses sent to the "From" field associated with messages sent by an intermediary service on behalf of a user are routed to the user remains a significant issue for both users of intermediary services and providers of intermediary services.

What is needed is a solution to the long standing problem of intermediary service users not receiving notification of misdirected responses associated with messages sent on their behalf by an intermediary service.

SUMMARY

In one embodiment, an intermediary service provides a message delivery system, including a message delivery system domain, through which messages can be generated and sent on behalf of users of the intermediary service. In one embodiment, a user of the intermediary service provides user notification routing address data representing a user routing address to be used to notify the user of any misdirected responses associated with messages sent through the message delivery system on behalf of the user and/or misdirected replies sent to the "From" field of the original with the message.

In one embodiment, each message sent on behalf of the user through the message delivery system, also referred to herein as the original message, is assigned a unique sender address including unique message identification data that is unique to the specific message being sent. In one embodiment, the unique sender address further includes message delivery system domain data identifying the actual domain of the intermediary service and/or message delivery system.

In one embodiment, at least a portion of the message data making up the textual body of the original message is correlated with the unique message identification data assigned to the original message and is stored. In one embodiment, at least a portion of the unique message identification data of the unique sender address assigned to the original message is mapped to the user routing address provided by the user and the mapped data is stored.

In one embodiment, intended recipient data is obtained representing an intended recipient routing address and is used to populate a "To" field of the original message to be sent on behalf of the user. In one embodiment, the unique sender address assigned to the original message is then used to populate the "From" field of the original message to be sent on behalf of the user. In one embodiment, the message data is included in the body of the original message.

Since, according to one embodiment, the unique sender address assigned to the original message, including the message delivery system domain data, is used to populate the "From" field of the original message, any notification of a misdirected response will first be delivered to the message system domain indicated by the message delivery system domain data of the unique sender address.

Once received, the unique sender address can then be analyzed to identify the user identification data in the unique sender address and the user identification data can then be mapped to the user notification routing address. Then notification of a misdirected response, and/or any portion thereof, and/or any portion of the message data included in the original message, can be relayed to the user using the user notification routing address.

In one embodiment, notification of the misdirected response using the user notification routing address includes instructions and/or data, such as the individual message identification data associated with the original message, needed to access at least a portion of the original message data correlated to the individual message identification data.

In email communications, associating the unique sender address in the From address with the delivery anomaly event notification data is the only effective means of tracking delivery anomaly events because by the email standard, email servers are only required to return a failure code, e.g. a delivery anomaly event notification, and only via the address in the From field, when sending a delivery anomaly event notification. Thus, the only reliable method of tracking delivery anomaly events is through delivery anomaly event notification data received via the address in the From field.

Consequently, in one embodiment, the user is provided both notice of any misdirected response at the user designated user notification routing address and is provided access to at least a portion of the original message data. This allows the user to not only be made aware of the misdirected response, but also allows the user to determine the content of the original message. In this way, the user is provided all the information necessary to correctly assess the situation and take the appropriate corrective action.

Using embodiments of the present disclosure, users of intermediary services are automatically notified of delivery anomaly events, misdirected replies, and/or any other misdirected responses made to the original message sent to the "From" field of the original message, using the unique sender address data in the "From" field of the message. Consequently, using embodiments of the present disclosure, a solution is provided to the long standing problem of lost notifications of misdirected responses. As a result, using embodiments of the present disclosure, the intermediary service can efficiently and effectively deliver more, if not all, of the message data generated through the message delivery system; can provide the user with a more useful intermediary service; and can provide the user with a more reliable, effective, and efficient user experience.

The various embodiments of the disclosure and their associated benefits therefore improve the technical fields of intermediary service implementation, message delivery, communications, and data processing by ensuring that notifications of delivery anomaly events, misdirected replies, and/or any other misdirected responses are not lost in the message delivery systems associated with the intermediary service. Furthermore, by increasing the reliability of message delivery, the intermediary service users will have more confidence in, and will be more likely to continue using, the intermediary service.

In addition, by providing notification of misdirected responses, embodiments of the present disclosure assist users in actively using an intermediary service. Therefore, implementations of embodiments of the present disclosure also represent a significant improvement to the field of user experience, particularly by allowing for the more efficient allocation of human and non-human resources. For example, by providing automatic delivery of notifications of misdirected responses, users are required to spend less time and energy managing their communications with intended recipients.

As a result, using implementations of embodiments of the present disclosure, the fields of intermediary services, message delivery, communications, and data processing are significantly improved.

BRIEF DESCRIPTION OF THE DRAWINGS

In accordance with one embodiment.

Figure 2A:
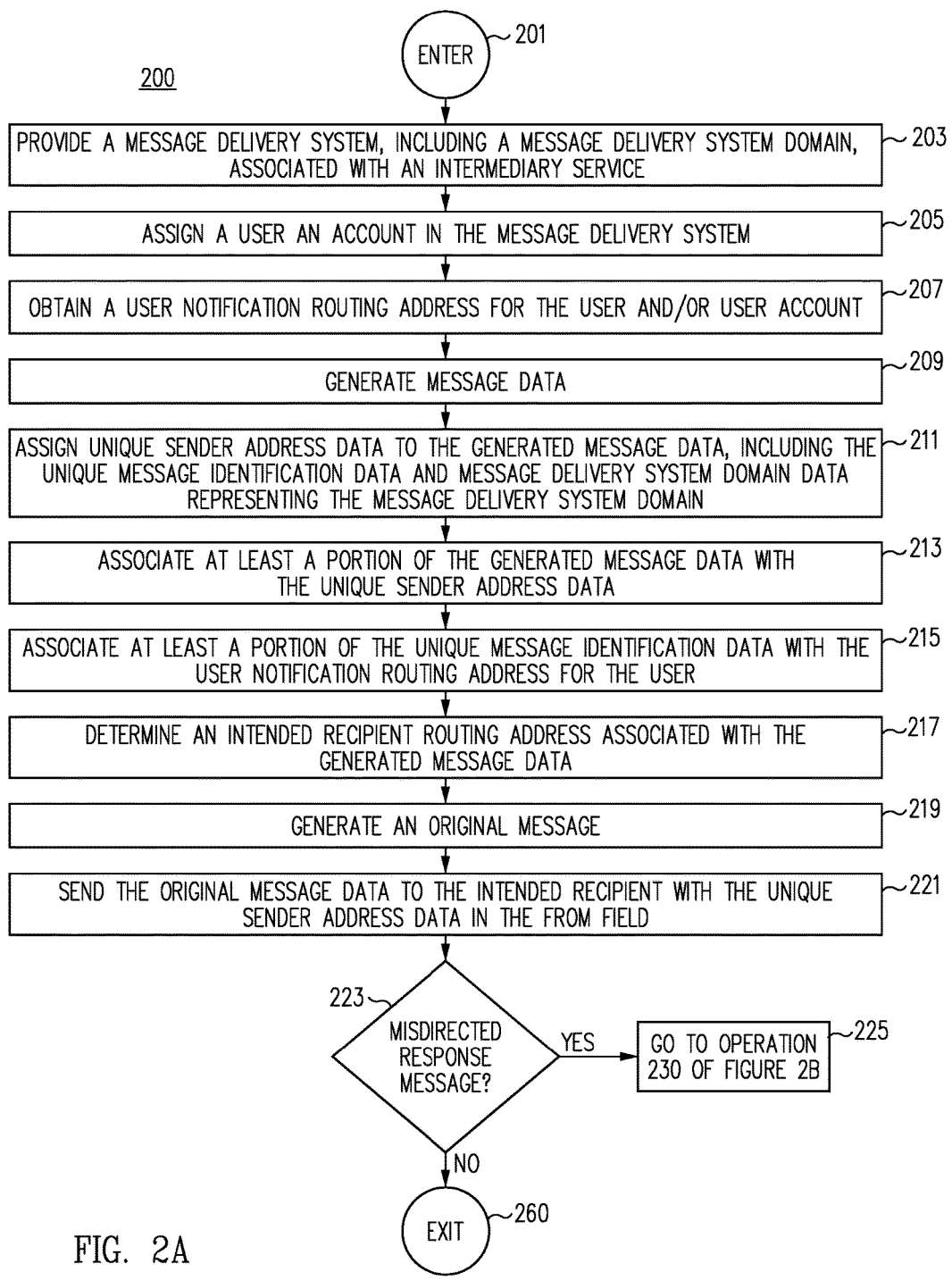
Figure 2B:
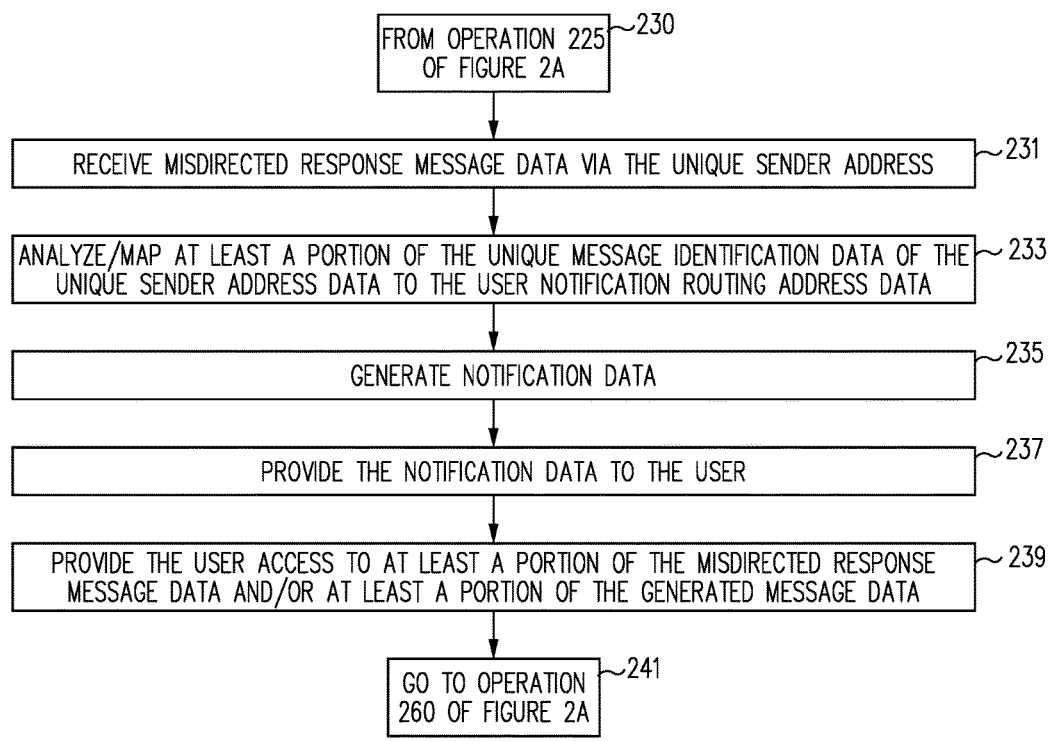
Figure 4:
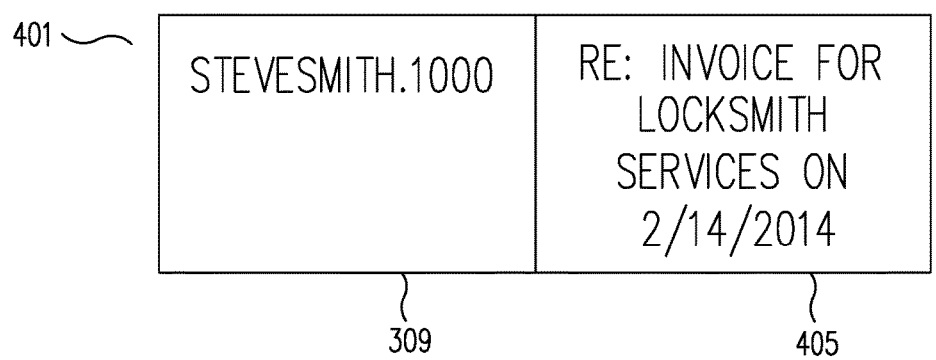
Figure 5:
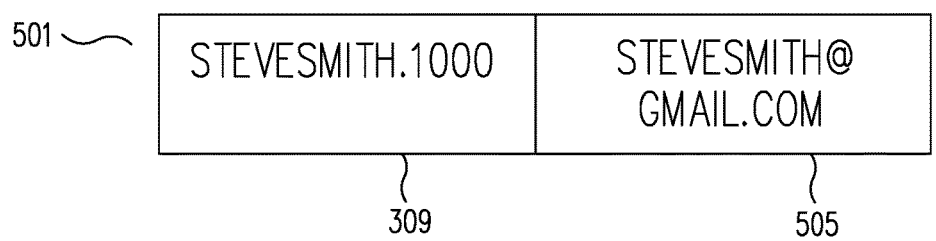
Figures 6, 7:
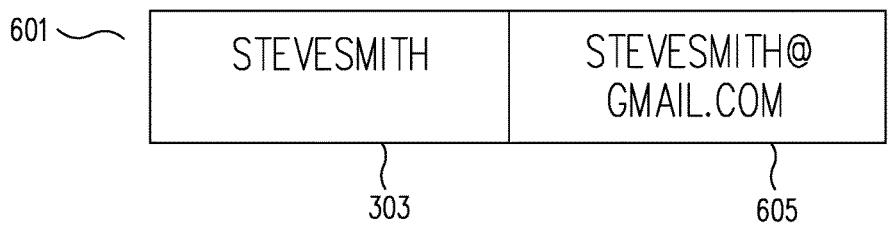

in accordance with one embodiment, FIGS. 2A and 2B together are a flow chart of a process for notifying users of misdirected replies associated with messages sent on the users' behalf by an intermediary service;

in accordance with one embodiment, FIG. 3A represents one example of a unique sender address and FIG. 3B represents one example of unique message identification data;

in accordance with one embodiment, FIG. 4 is an example of a table correlating a portion of generated message data and individual message identifier data;

in accordance with one embodiment, FIG. 5 is an example of a table correlating user notification routing address data to individual message identification data;

in accordance with one embodiment, FIG. 6 is an example of a table correlating a portion of user identification data and user notification routing address data;

in accordance with one embodiment, FIG. 7 is an example of original message data with intended recipient data populating the "To" field; unique sender address data populating the "From" field; user routing address data populating the "Reply To" field; and generated message data populating the "Subject" field; and in accordance with one embodiment, FIG. 8 is an example of a notification message.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s and/or described below. Rather, these exemplary embodiments are provided to allow a complete disclosure that conveys the principles of the invention, as set forth in the claims, to those of skill in the art.

As used herein, the terms "computing system," "computing device," and "computing entity," include, but are not limited to, the following: a virtual asset; a server computing system; a workstation; a desktop computing system; a mobile computing system, including, but not limited to, smart phones, cellular phones, portable devices, and/or devices worn or carried by a user; a database system or storage cluster; a switching system; a router; any hardware system; any communications system; any form of proxy system; a gateway system; a firewall system; a load balancing system; and/or any device, subsystem, or mechanism that includes components that can execute all, or part, of any one of the processes and/or operations as described herein.

In addition, as used herein, the terms "computing system," "computing device," and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, and/or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given application as that application is intended to be used. In various embodiments, production environments can include multiple assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other virtual and/or physical assets/components making up an actual production environment in which an application is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application, service, or intermediary service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal," entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network;

a satellite network; a cable network; any combination of different network types; and/or any other system capable of allowing communication between two or more assets, virtual assets, and/or computing systems, whether available or known at the time of filing or as later developed.

As used herein, the term "message delivery system" includes, but is not limited to, any data delivery and/or transmission system implemented on a computing system, accessed through one or more servers, accessed through a network, accessed through a cloud, and/or provided through any computing system or by any means, as discussed herein, and/or as known in the art at the time of filing, and/or developed after the time of filing, that has the capability to deliver message data. Specific examples of message delivery systems include, but are not limited to: Email systems; multimedia messaging services (MMS), short messaging services (SMS), enhanced messaging services, internet relay chat services, instant messaging services, or any service that uses at least one standardized communication protocol to provide, store, and manage the exchange of messages. One specific illustrative example of a messaging service is Mobile Messaging, which may be a combination of MMS and SMS. Further, other examples of messaging services include Google Chat, Facebook Chat, American Online Instant Messenger, Yahoo! Instant Messenger, etc.

Herein the terms "message" and "message data" include script (text) or object (content) that communicates information between messaging accounts. Examples of text and content include typed text, electronic mail, pictures, videos, web links, locations, contacts, or any media, multimedia, and the like. A message may also include content within text or associated with text.

Herein, message delivery systems may include one or more of a variety of resources, including website databases, file storage databases, media databases, data repositories, and the like that are implemented through hardware, software, or both to provide, store, and manage service information.

Herein, the term "intermediary service" includes, but is not limited to, any hardware, software, or combination of hardware and software, providing access to, utilizing, and/or otherwise associated with, a message delivery system used to send and/or receive messages on behalf of a user to, and/or from, an intended recipient. In various embodiments, an intermediary service can be implemented on a computing system, accessed through one or more servers, accessed through a network, accessed through a cloud, and/or provided by any means, as discussed herein, and/or as known in the art at the time of filing, and/or developed after the time of filing. In various embodiments, the intermediary service provides access to, utilizes, or is otherwise associated with, the message delivery system, as part of a service provided to the users of the intermediary service.

Specific examples of intermediary services include, but are not limited to, one or more software data management systems, and/or hardware systems associated with software data management systems, such as, but not limited to, the following: Quicken™, available from Intuit, Inc. of Mountain View, Calif.; Quicken On-line™, available from Intuit, Inc. of Mountain View, Calif.; QuickBooks™, available from Intuit, Inc. of Mountain View, Calif.; QuickBooks On-line™, available from Intuit, Inc. of Mountain View, Calif.; and/or any software data management systems, and/or hardware systems associated with software data management systems, used to send and/or receive messages on behalf of a user, as discussed herein, and/or known to those of skill in the art at the time of filing, and/or as developed after the time of filing.

As used herein, the term "domain," includes but is not limited to: computing systems, and/or combinations of hardware and software systems, providing a sub-network made up of a multiple computing systems under the control of one central security databases; and/or all computing systems, software systems, and/or combinations of hardware and software systems sharing a common portion of a Universal Resource Locator (URL), or address, and therefore associated with a common Internet hosting service, e.g., common Internet web servers, and/or similar functionality. In various embodiments, domain names are mapped to Internet Protocol (IP) addresses assigned computing systems, and/or combinations of hardware and software systems, and therefore include data identifying the computing systems, and/or combinations of hardware and software systems. Herein the terms "domain," web server," "server," and "server system" may be used interchangeable.

Herein the terms "delivery anomaly," "delivery anomaly message," "delivery anomaly event," or "delivery anomaly event notification message" involve incidences where transmitted message data, e.g. an email or text message, sent to a recipient party at a recipient party address is not received at the recipient party address, e.g., there was a delivery failure at the recipient party address.

Herein the terms "delivery anomaly data," "delivery anomaly message data," "delivery anomaly event data," or "delivery anomaly event notification message data" include, but are not limited to, data associated with transmitted message data, e.g. an email or text message sent to a recipient party at a recipient party address, indicating that the message data was not received at the recipient party address assigned to the message data at the time of transmission, e.g., there was a delivery failure at the recipient party address.

As used herein the terms "misdirected reply" and "misdirected reply message" include, but are not limited to, any message sent to the "From" field of an original message, the original message having been sent to an intended recipient by an intermediary service on behalf of an user message.

As used herein the terms "misdirected reply data" and "misdirected reply message data" include, but are not limited to, data associated with any message sent to the "From" field of an original message, the original message having been sent to an intended recipient by an intermediary service on behalf of an user message.

As used herein the terms "misdirected response" and "misdirected response message" include, but are not limited to: a delivery anomaly event or delivery anomaly event notification message including delivery anomaly event data sent to the "From" field of an original message; a misdirected reply message sent to the "From" field of an original message, the original message having been sent to an intended recipient by an intermediary service on behalf of an user message; and/or any error message.

As used herein the terms "misdirected response data" and "misdirected response message data" include, but are not limited to, data associated with a delivery anomaly event or delivery anomaly event notification message including delivery anomaly event data; a misdirected reply message sent to the "From" field of an original message, the original message having been sent to an intended recipient by an intermediary service on behalf of an user message; and/or any error message.

Herein, the terms "user," "user consumer," and "customer" are used interchangeably to denote any party and/or entity that interfaces with, and/or with which information is exchanged, using the method and system for notifying users of misdirected response messages associated with messages sent on the users' behalf by an intermediary service described herein, and/or a person and/or entity that interfaces with, and/or with which information is exchanged, using the method and system for notifying users of misdirected response messages associated with messages sent on the users' behalf by an intermediary service described herein, and/or a legal guardian of person and/or entity that interfaces with, and/or with which information is exchanged, using the method and system for notifying users of misdirected response messages associated with messages sent on the users' behalf by an intermediary service described herein, and/or an authorized agent of any party and/or person and/or entity that interfaces with, and/or with which information is exchanged, using the method and system for notifying users of misdirected response messages associated with messages sent on the users' behalf by an intermediary service described herein. For instance, in various embodiments, a user can be, but is not limited to, a person, a commercial entity, an application, a service, and/or a computing system.

System and Method Overview and Architecture

In one embodiment, a method for notifying users of misdirected response messages associated with messages sent on the users' behalf by an intermediary service includes providing a message delivery system associated with an intermediary service.

Figure 1:
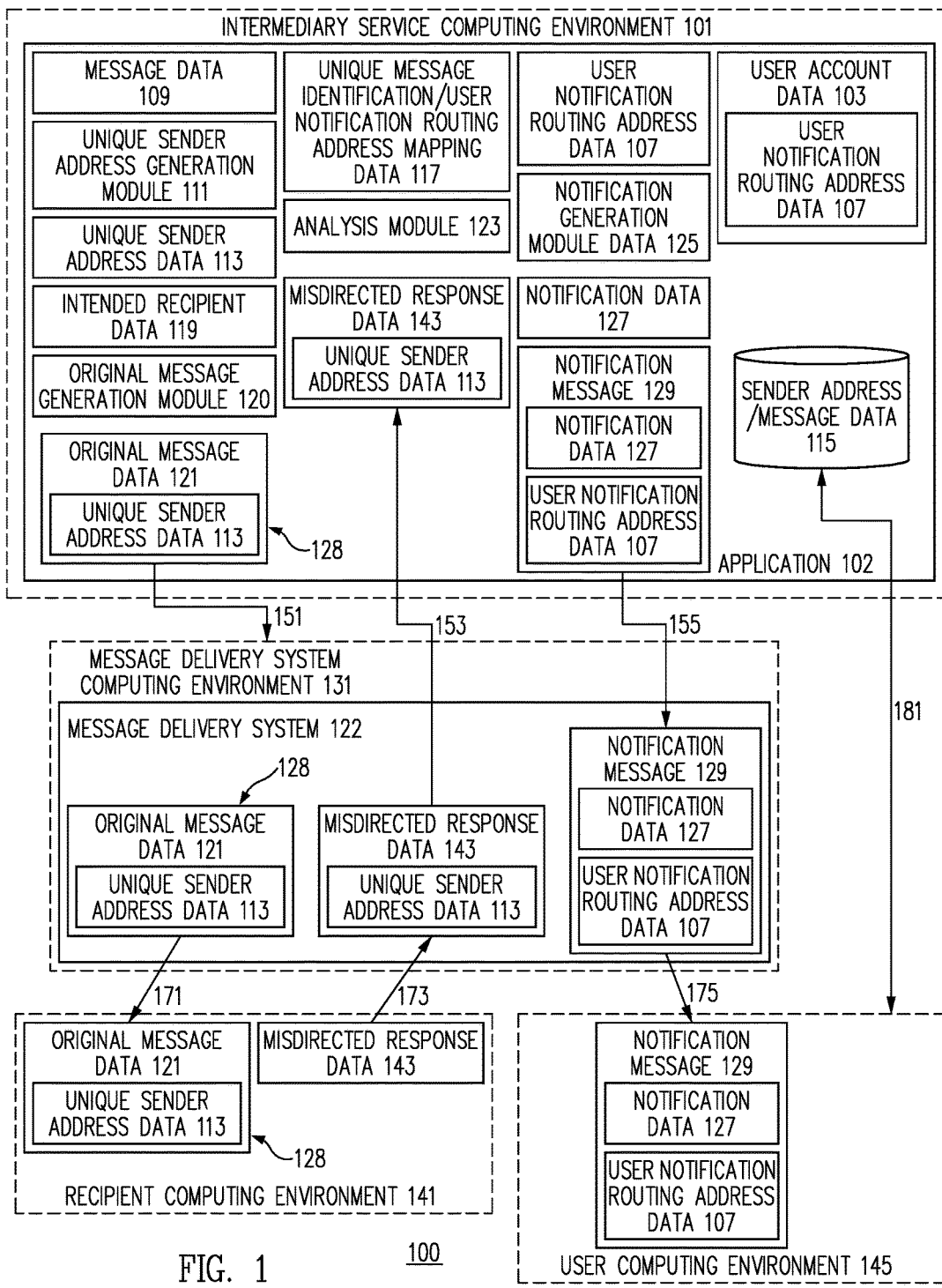
FIG. 1 is a block diagram of architecture implementing a method and system for notifying users of misdirected response messages associated with messages sent on the users' behalf by an intermediary service in accordance with one embodiment.

FIG. 1 is a functional diagram of the interaction of various elements associated with one embodiment of the methods and systems for notifying users of misdirected response message data discussed herein.

As seen in FIG. 1, an intermediary service in the form of APPLICATION 102 is implemented in INTERMEDIARY SERVICE COMPUTING ENVIRONMENT 101. In various embodiments, INTERMEDIARY SERVICE COMPUTING ENVIRONMENT 101 can be any computing environment as discussed herein, and/or as known in the art at the time of filing, and/or as known in the art after the time of filing.

Specific examples of intermediary services include, but are not limited to, one or more software data management systems, and/or hardware systems associated with software data management systems, such as, but not limited to, the following: TurboTax™, available from Intuit, Inc. of Mountain View, Calif.; TurboTax On-Line™, available from Intuit, Inc. of Mountain View, Calif.; Quicken™, available from Intuit, Inc. of Mountain View, Calif.; Quicken On-line™, available from Intuit, Inc. of Mountain View, Calif.; QuickBooks™, available from Intuit, Inc. of Mountain View, Calif.; QuickBooks On-line™, available from Intuit, Inc. of Mountain View, Calif.; and/or any software data management systems, and/or hardware systems associated with software data management systems, used to send and/or receive messages on behalf of a user, as discussed herein, and/or known to those of skill in the art at the time of filing, and/or as developed after the time of filing.

In various embodiments, the intermediary service provides access to, utilizes, or is otherwise associated with, the message delivery system, as part of the service provided to the users of the intermediary service.

Returning to FIG. 1, MESSAGE DELIVERY SYSTEM 122 is implemented in MESSAGE DELIVERY SYSTEM COMPUTING ENVIRONMENT 131. In various embodiments, MESSAGE DELIVERY SYSTEM COMPUTING ENVIRONMENT 131 can be any computing environment as discussed herein, and/or as known in the art at the time of filing, and/or as known in the art after the time of filing.

Those of skill in the art will readily recognize that in various embodiments, INTERMEDIARY SERVICE COMPUTING ENVIRONMENT 101 and MESSAGE DELIVERY SYSTEM COMPUTING ENVIRONMENT 131 can be the same computing environment or implemented across two or more computing environments.

In various embodiments, MESSAGE DELIVERY SYSTEM 122 may be one or more of a variety of resources, including website databases, file storage databases, media databases, data repositories, and the like that are implemented through hardware, software, or both to provide, store, and manage service information.

In one embodiment, the message delivery system includes a message delivery system domain. In one embodiment, a user desiring to utilize the message delivery system in connection with the intermediary service is assigned an account in the message delivery system by the intermediary service.

As seen in FIG. 1 the user account is represented by USER ACCOUNT DATA 103.

In various embodiments, the intermediary service provides access to, utilizes, or is otherwise associated with, the message delivery system, as part of a service provided to the users of the intermediary service.

In one embodiment, a user notification routing address is obtained from the user. As seen in FIG. 1, the USER NOTIFICATION ROUTING ADDRESS DATA 107 is embodied in USER ACCOUNT DATA 103.

In one embodiment, the user notification routing address is a routing address associated with the user, such as, but not limited to, an email address or phone number. In one embodiment, the user notification routing address is to be used to relay misdirected response messages and/or misdirected response message data, such as, but not limited to, delivery anomaly events, delivery anomaly event data, misdirected replies, and/or misdirected reply message data, to the user upon the occurrence of misdirected response messages being received by the intermediary service involving one or more messages associated with the user sent through the message delivery system, also called original messages. In one embodiment, the user notification routing address is associated with the user outside of the message delivery system In accordance with one embodiment, message data, such as email or text message text/body data, is generated through, or provided to, the message delivery system by, or on behalf of, the user, via an original message.

Returning to FIG. 1, MESSAGE DATA 109 represents the message data to be generated through, or provided to, MESSAGE DELIVERY SYSTEM 122 via ORIGINAL MESSAGE GENERATION MODULE 120.

In one embodiment, the original message to be sent via the message delivery system is assigned a unique sender address, represented by unique "sender address data," that is used to populate the "From" data field of the original message to be sent through the message delivery system. As seen in FIG. 1, UNIQUE SENDER ADDRESS DATA 113 represents a unique sender address. In one embodiment, the unique sender address assigned to the specific message includes unique message identification data that identifies the user and uniquely identifies the specific message.

In one embodiment, the unique message identification data of the unique sender address includes user identification data and individual message identification data. In one embodiment, the user identification data of the unique message identification data of the unique sender address identifies the user, and/or a user account within the message delivery system. In one embodiment, the user identification data is selected by the user, or is associated with the user, and can be, but is not limited to, the user's name, the user's initials, or any other data identifying, or associated with, the user, or user account.

FIG. 3A represents one example of a unique sender address 300 and FIG. 3B represents one example of unique message identification data 309 that is, in one embodiment, the combination of user identification data STEVESMITH (Element 303 in FIG. 3A) and individual message identification data 0.1000 (Element 305 in FIG. 3A).

As seen in FIG. 3A, unique sender address 300 includes the unique sender address data STEVESMITH.1000@MAIL.QBO.INTUIT.COM (Element 301 in FIG. 3A).

As noted above, the unique sender address data STEVESMITH.1000@MAIL.QBO.INTUIT.COM (Element 301 in FIG. 3A) includes user identification data STEVESMITH (Element 303 in FIG. 3A), individual message identification data 0.1000 (Element 305 in FIG. 3A), message delivery system domain data MAIL.QBO.INTUIT.COM (Element 307 in FIG. 3A), and the unique message identification data STEVESMITH.1000 (Element 309 in FIG. 3B), that, in one embodiment, is the combination of user identification data STEVESMITH (Element 303 in FIG. 3A) and individual message identification data 0.1000 (Element 305 in FIG. 3A). In one embodiment, the user identification data STEVESMITH (Element 303 in FIG. 3A) of the unique sender address data STEVESMITH.1000@MAIL.QBO.INTUIT.COM (Element 301 in FIG. 3A) identifies the user, and/or a user account within the message delivery system. In one embodiment, the user identification data STEVESMITH (Element 303 in FIG. 3A) is selected by the user, or is associated with the user, and can be, but is not limited to, the user's name, the user's initials, or any other data identifying, or associated with, the user, or user account.

In one embodiment, the individual message identification data 0.1000 (Element 305 in FIG. 3A) of the unique sender address data STEVESMITH.1000@MAIL.QBO.INTUIT.COM (Element 301 in FIG. 3A) uniquely identifies the specific message being sent by the user identified by the user identification data. In one embodiment, the individual message identification data 0.1000 (Element 305 in FIG. 3A) is selected/assigned by the message delivery system, and/or intermediary system, and includes, but is not limited to, alpha-numeric symbols uniquely identifying the specific message sent by the user and being delivered through the message delivery system.

In one embodiment, in addition to unique message identification data STEVESMITH.1000 (Element 309 in FIG. 3B), the unique sender address assigned to the specific message includes message delivery system domain data MAIL.QBO.INTUIT.COM (Element 307 in FIG. 3A) that includes the domain name for the message delivery system associated with the intermediary service. As discussed above, by including message delivery system domain data MAIL.QBO.INTUIT.COM (Element 307 in FIG. 3A) in the assigned unique sender address that accurately identifies the domain name for the message delivery system that is actually sending out the message, the messages sent from the message delivery system will not be identified as spam or other malware by the currently employed malware blocking systems. Consequently, messages with an assigned unique sender address according to the disclosed embodiments are far more likely to result in a successfully delivered message than those that include domain names not associated with the message delivery system.

Returning to FIG. 1, shown is UNIQUE SENDER ADDRESS GENERATION MODULE 111, which generates the unique sender address, such as 301 of FIG. 3. Also shown in FIG. 1 is UNIQUE SENDER ADDRESS DATA 113, which is the data representing the unique sender address, such as 301 of FIG. 3.

In one embodiment, at least a portion of the generated message data of the message is associated with the at least a portion of the unique sender address, represented by unique sender address data, and in particular, with the unique message identification data included in the unique sender address data. In one embodiment, at least a portion of the generated message data and at least the unique message identification data of the unique sender address, are correlated and stored. Consequently, at least a portion of the generated message data can be identified and accessed using the individual message identifier data at any time after the message is transmitted to the intended recipient by the message delivery system.

FIG. 4 shows an example of a table 401 correlating a portion of the generated message data RE: INVOICE FOR LOCKSMITH SERVICES ON 2/14/2014 (Element 405 in FIG. 4) and the unique message identification data STEVESMITH.1000 (Element 309 in FIG. 4).

Returning to FIG. 1, a portion of MESSAGE DATA 109 and a portion of UNIQUE SENDER ADDRESS DATA 113 are correlated and stored as SENDER ADDRESS/MESSAGE DATA 115.

In one embodiment, at least part of the unique sender address assigned to the message is mapped to the user notification routing address.

Returning to FIG. 1, the data associated with mapping the unique message identification data of the unique sender address to the user notification routing address is represented by UNIQUE MESSAGE IDENTIFICATION/USER NOTIFICATION ROUTING ADDRESS MAPPING DATA 117.

In one embodiment, all the unique message identification data of the unique sender address assigned to the message, including the user identification data and the individual message identification data, is mapped to the user notification routing address.

Consequently, as discussed below, any response message sent to the "From" field of the message, i.e., the unique sender address assigned to the message, will be first delivered to the message system domain indicated by the message delivery system domain data of the unique sender address. However, as also discussed below, the unique sender address can then be analyzed to identify the unique message identification data and the unique message identification data can then be mapped to the user notification routing address. Then, as discussed below, a notification of the response message, and/or any portion of the response message data, and/or any portion of the message data included in the original message, can be relayed to the user using the user notification routing address.

As a specific illustrative example of this embodiment, if a delivery anomaly event notification message is sent/returned to the unique sender address assigned to the message appearing in the "From" field of the message, the message will first be delivered to the message system domain indicated by the message delivery system domain data of the unique sender address. However, the unique sender address can then be analyzed by the message delivery system and/or the intermediary service to identify the unique message identification data. The unique message identification data can then be mapped to the user notification routing address. Then a notification of the delivery anomaly event, and/or any portion of the delivery anomaly event data included in delivery anomaly event notification message, and/or any portion of the message data included in the original message, can then be relayed to the user by the message delivery system and/or the intermediary service using the user notification routing address.

FIG. 5 shows an example of a table 501 correlating user notification routing address data STEVESMITH@GMAIL.COM (Element 505 in FIG. 5) to unique message identification data STEVESMITH.1000 (Element 309 in FIG. 5).

In one embodiment, only the user identification data of the unique message identification data of the unique sender address assigned to the message is mapped to the user notification routing address. Consequently, as discussed below, any response message sent to the "From" field of the message, i.e., the unique sender address assigned to the message, will first be delivered to the message system domain indicated by the message delivery system domain data of the unique sender address. However, as also discussed below, the unique sender address can then be analyzed to identify the user identification data in the unique sender address and the user identification data can then be mapped to the user notification routing address. Then, as discussed below, a notification of the response message, and/or any portion of the response message data, and/or any portion of the message data included in the original message, can be relayed to the user using the user notification routing address.

As a specific illustrative example of this embodiment, if a delivery anomaly event notification message is sent/returned to the unique sender address assigned to the message appearing in the "From" field of the message, the message will be first delivered to the message system domain indicated by the message delivery system domain data of the unique sender address. However, the unique sender address can then be analyzed by the message delivery system and/or the intermediary service to identify the user identification data in the unique sender address. The user identification data can then be mapped to the user notification routing address. Then a notification of the delivery anomaly event, and/or any portion of the delivery anomaly event data included in the delivery anomaly event notification message, and/or any portion of the message data included in the original message, can then be relayed to the user by the message delivery system and/or the intermediary service using the user notification routing address.

FIG. 6 shows an example of a table 601 correlating a portion of the user identification data STEVESMITH (Element 303 in FIG. 6) and user notification routing address data STEVESMITH@GMAIL.COM (Element 605 in FIG. 6).

In one embodiment, an intended recipient for the original message is determined and intended recipient data to be used to populate the "To" field of the original message is generated and/or obtained.

Returning to FIG. 1, INTENDED RECIPIENT DATA 119 is representative of intended recipient data.

In one embodiment, an original message is generated through the intermediary system on behalf of the user and the intended recipient data is used to populate the "To" field of the original message. In addition, the original message includes a "From" field populated, according to one embodiment, with unique sender address data representing the unique sender address assigned to the message. In one embodiment, the original message includes a "Reply To" field, which, in one embodiment, can include either the user routing address data, representing the user routing address provided by the user, or the unique sender address data representing the unique sender address assigned to the message. In one embodiment, the original message also includes the generated message data.

In one embodiment, the original message includes a "To" field populated with intended recipient data representing multiple intended recipients.

FIG. 7 represents original message data 701 with intended recipient data SALLY-JONES12@YAHOO.COM populating the "To" field 703; unique sender address data STEVESMITH.1000@MAIL.QBO.INTUIT.COM populating the "From" field 705; user routing address data STEVESMITH@GMAIL.COM populating the "Reply To" field 707; and generated message data RE: INVOICE FOR LOCKSMITH SERVICES ON 2/14/2014 populating the "Subject" field 709.

Returning to FIG. 1, the original message is represented by ORIGINAL MESSAGE 128 including ORIGINAL MESSAGE DATA 121 and UNIQUE SENDER ADDRESS DATA 113 as generated by ORIGINAL MESSAGE GENERATION MODULE 120.

In one embodiment, the original message is sent, transmitted, or otherwise transferred from INTERMEDIARY SERVICE COMPUTING ENVIRONMENT 101 to MESSAGE DELIVERY SYSTEM COMPUTING ENVIRONMENT 131 via COMMUNICATIONS CHANNEL 151. In one embodiment COMMUNICATIONS CHANNEL 151 is any communications channel as discussed herein, as known in the art at the time of filing, and/or as known in the art after the time of filing.

In one embodiment, the original message is sent, transmitted, or otherwise transferred to the intended recipient indicated by intended recipient data.

Returning to FIG. 1, in one embodiment, the intended recipient receives the original message in RECIPIENT COMPUTING ENVIRONMENT 141. In various embodiments, RECIPIENT COMPUTING ENVIRONMENT 141 can be any computing environment as discussed herein, and/or as known in the art at the time of filing, and/or as known in the art after the time of filing.

Returning to FIG. 1, in one embodiment, the original message is sent, transmitted, or otherwise transferred from MESSAGE DELIVERY SYSTEM COMPUTING ENVIRONMENT 131 to RECIPIENT COMPUTING ENVIRONMENT 141 via COMMUNICATIONS CHANNEL 171. In one embodiment, COMMUNICATIONS CHANNEL 171 is any communications channel as discussed herein, as known in the art at the time of filing, and/or as known in the art after the time of filing.

In one embodiment, if the generated message is properly received by the intended recipient indicated by intended recipient data, the intended recipient does not send a reply message to the "From" field of the message, i.e., no misdirected response message is generated, then no further action is required.

However, in one embodiment, if the generated message is not received by the intended recipient indicated by intended recipient data, i.e., there is a message anomaly event, or if the intended recipient does send a reply message to the "From" field of the message, i.e., a misdirected reply is generated, then the misdirected response, whether notification of a message anomaly event or a misdirected reply, is sent to the "From" field of the message, i.e., the unique sender address assigned to the message, and will therefore first be delivered to the message delivery system domain indicated by the message delivery system domain data of the unique sender address.

In one embodiment, if the generated message data is not received by one or more of multiple intended recipients, and/or if one or more of the multiple intended recipients sends a response to the "From" field of the message, then the misdirected responses are sent to the "From" field of the message and will first be delivered to the message delivery system domain indicated by the message delivery system domain data of the unique sender address.

Returning to FIG. 1, in one embodiment, the misdirected response is represented by MISDIRECTED RESPONSE DATA 143. In one embodiment, MESSAGE RESPONSE DATA 143 is sent, transmitted, or otherwise transferred via COMMUNICATIONS CHANNEL 173. In one embodiment COMMUNICATIONS CHANNEL 173 is any communications channel as discussed herein, as known in the art at the time of filing, and/or as known in the art after the time of filing.

In one embodiment, the unique sender address is automatically analyzed by the intermediary service and/or message delivery system associated with the intermediary service to identify the entire unique message identification data in the unique sender address.

Returning to FIG. 1, in one embodiment, MISDIRECTED RESPONSE DATA 143 and UNIQUE SENDER ADDRESS DATA 113 are sent, transmitted, or otherwise transferred to ANALYSIS MODULE 123 via COMMUNICATIONS CHANNEL 153. In one embodiment COMMUNICATIONS CHANNEL 153 is any communications channel as discussed herein, as known in the art at the time of filing, and/or as known in the art after the time of filing.

In one embodiment, the unique sender address is automatically analyzed by the intermediary service and/or message delivery system associated with the intermediary service to identify the user identification data in the unique sender address.

In one embodiment, the identified user identification and/or user identification data is then mapped to the user notification routing address provided by the user.

In one embodiment, notification data representing a notification of the misdirected response message, and/or any portion of the misdirected response message data, and/or any portion of the original message data included in the original message, is generated.

In one embodiment, notification data representing a notification of misdirected responses received after message data is not received by one or more of multiple intended recipients and/or one or more of the multiple intended recipients sends a response to the "From" field of the message is generated. In one embodiment, the notification data includes intended recipient data representing those intended recipients that did not receive the generated message data and/or those intended recipients that sent a response to the "From" field of the message. Thus, in one embodiment, the user receives a notification that a subset of the multiple intended recipients did not receive the generated message data and/or sent a response to the "From" field of the message.

Returning to FIG. 1, in one embodiment, NOTIFICATION DATA 127 represents the notification data. In one embodiment, NOTIFICATION GENERATION MODULE 125 generates notification data.

In one embodiment, the notification data is then provided to the user by the message delivery system and/or the intermediary service using the user notification routing address.

Returning to FIG. 1, in one embodiment, the notification data is provided to the user via NOTIFICATION MESSAGE 129, which contains NOTIFICATION DATA 127 and USER NOTIFICATION ROUTING ADDRESS DATA 107.

In one embodiment, the notification data is sent, transmitted, or otherwise transferred to MESSAGE DELIVERY SYSTEM 122 by COMMUNICATIONS CHANNEL 155. In one embodiment COMMUNICATIONS CHANNEL 155 is any communications channel as discussed herein, as known in the art at the time of filing, and/or as known in the art after the time of filing.

In one embodiment, the notification data relayed to the user by the message delivery system and/or the intermediary service using the user notification routing address includes instructions and/or data, such as the individual message identification data associated with the original message, needed to access at least a portion of the generated message data correlated to the individual message identification data.

In one embodiment, the notification data is sent, transmitted, or otherwise transferred to USER COMPUTING ENVIRONMENT 145 by COMMUNICATIONS CHANNEL 175. In various embodiments, USER COMPUTING ENVIRONMENT 145 can be any computing environment as discussed herein, and/or as known in the art at the time of filing, and/or as known in the art after the time of filing. In one embodiment COMMUNICATIONS CHANNEL 175 is any communications channel as discussed herein, as known in the art at the time of filing, and/or as known in the art after the time of filing.

Those of skill in the art will readily recognize that in various embodiments, COMMUNICATIONS CHANNELS 151, 153, 155, 171, 173, 175, and 181 can be the same communications channel or implemented across two or more communications channels.

Consequently, according to one or more of the disclosed embodiments, the user is provided both notice of any delivery anomaly event notification and/or misdirected reply at the user designated user notification routing address and is provided access to at least a portion of the original message data.

Returning to FIG. 1, in one embodiment, the user is provided access to SENDER ADDRESS/MESSAGE DATA 115 via COMMUNICATIONS CHANNEL 181. In one embodiment, COMMUNICATIONS CHANNEL 181 is any communications channel as discussed herein, as known in the art at the time of filing, and/or as known in the art after the time of filing.

This allows the user to not only be made aware of the notification of delivery anomaly event notification and/or misdirected reply, but also allows the user to determine the content of the original message. In this way, the user is provided all the information necessary to correctly assess the situation and take the appropriate corrective action.

FIG. 8 is an example of a notification message 801. In one embodiment, the existence of the misdirected response message data, and/or delivery anomaly event, and/or misdirected rely message is brought to the user's attention via email message 803. In one embodiment, the user is provided with a link 805 that allows the user to access at least a portion of the misdirected response message data and/or at least a portion of the message data included in the original message.

Using embodiments of the present disclosure, users of intermediary services are automatically notified of delivery anomaly event notifications, misdirected replies, and any other misdirected responses made to the original message and sent to the "From" field of the original message, using the unique sender address data in the "From" field of the message. Consequently, using embodiments of the present disclosure, a solution is provided to the long standing problem of lost delivery anomaly event notifications and misdirected replies. As a result, using embodiments of the present disclosure, the intermediary service can efficiently and effectively deliver more, if not all, of the message data generated through the message delivery system; can provide the user with a more useful intermediary service; and can provide the user with a more reliable, effective, and efficient user experience.

The various embodiments of the disclosure and their associated benefits therefore improve the technical fields of intermediary service implementation, message delivery, communications, and data processing by ensuring that delivery anomaly event notifications, automated error messages, and misdirected replies are not lost in the message delivery systems associated with the intermediary service. Furthermore, by increasing the reliability of message delivery, the intermediary service users will have more confidence in, and will be more likely to continue using, the intermediary service.

In addition, by providing notifications of delivery anomaly events and/or misdirected replies to the correct, and most interested parties, embodiments of the present disclosure assist users in actively using an intermediary service. Therefore, implementations of embodiments of the present disclosure also represent a significant improvement to the field of user experience, particularly by allowing for the more efficient allocation of human and non-human resources. For example, by providing automatic notification of delivery anomaly events and/or misdirected replies to the user, users are required to spend less time and energy managing their communications with intended recipients.

As a result, using implementations of embodiments of the present disclosure, the fields of intermediary services, message delivery, communications, and data processing are significantly improved.

Process

In accordance with one embodiment of a process for notifying users of misdirected response messages associated with messages sent on the users' behalf by an intermediary service, an intermediary service provides a message delivery system, including a message delivery system domain, through which messages can be generated and sent on behalf of users of the intermediary service.

In one embodiment, a user of the intermediary service provides user notification routing address data representing a user routing address to be used to notify the user of any misdirected response messages associated with messages sent through the message delivery system on behalf of the user, including delivery anomaly event notifications and/or misdirected replies sent to the "From" field of the original with the message.

In one embodiment, each message sent on behalf of the user through the message delivery system, also referred to herein as the original message, is assigned a unique sender address including unique message identification data that is unique to the specific message being sent. In one embodiment, the unique sender address further includes message delivery system domain data identifying the actual domain of the intermediary service and/or message delivery system.

In one embodiment, at least a portion of the message data making up the textual body of the original message is correlated with the unique message identification data assigned to the original message and the mapped data is stored. In one embodiment, at least a portion of the unique message identification data of the unique sender address assigned to the original message is mapped to the user routing address provided by the user and the mapped data is stored.

In one embodiment, intended recipient data is obtained representing an intended recipient routing address and is used to populate a "To" field of the original message to be sent on behalf of the user. In one embodiment, the unique sender address assigned to the original message is then used to populate the "From" field of the original message to be sent on behalf of the user. In one embodiment, the message data is included in the body of the original message.

Since, according to one embodiment, the unique sender address assigned to the original message, including the message delivery system domain data, is used to populate the "From" field of the original message, any misdirected response message sent to the "From" field of the original message will first be delivered to the message system domain indicated by the message delivery system domain data of the unique sender address.

Once received, the unique sender address can then be analyzed to identify the user identification data in the unique sender address. The user identification data can then be mapped to the user notification routing address. Then, any misdirected response message sent to the "From" field of the original message, and/or any portion thereof, and/or any portion of the message data included in the original message, can be relayed to the user using the user notification routing address.

In one embodiment, the misdirected response message sent to the "From" field of the original message relayed to the user by the message delivery system and/or the intermediary service using the user notification routing address includes instructions and/or data, such as the individual message identification data associated with the original message, needed to access the original message data correlated to the individual message identification data.

Consequently, in one embodiment, the user is provided both notice of any misdirected response message sent to the "From" field of the original message at the user designated user notification routing address and is provided access to at least a portion of the original message data. This allows the user to not only be made aware of a delivery anomaly event notification or misdirected reply sent to the "From" field of the original message, but also allows the user to determine the content of the original message. In this way, the user is provided all the information necessary to correctly assess the situation and take the appropriate corrective action.

FIG. 2 is a flow chart representing one example of a process 200 for notifying users of misdirected response messages associated with messages sent on the users' behalf by an intermediary service in accordance with one embodiment.

As seen in FIG. 2, process 200 for notifying users of misdirected response messages associated with messages sent on the users' behalf by an intermediary service begins at ENTER OPERATION 201 and process flow proceeds to PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203.

As noted above, the intermediary service associated with the message delivery system provided at PROVIDE A MESSAGE DELIVERY SYSTEM, INCLUDING A MES- SAGE DELIVERY SYSTEM DOMAIN, ASSOCIATED WITH AN INTERMEDIARY SERVICE OPERATION 203 can be, but is not limited to, any hardware, software, or combination of hardware and software, providing access to, utilizing, and/or otherwise associated with, a message delivery system used to send and/or receive messages on behalf of a user to, and/or from, an intended recipient.

In various embodiments, the intermediary service associated with the message delivery system at PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 can be implemented on a computing system, accessed through one or more servers, accessed through a network, accessed through a cloud, and/or provided by any means, as discussed herein, and/or as known in the art at the time of filing, and/or developed after the time of filing.

In various embodiments, the intermediary service associated with the message delivery system at PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 provides access to, utilizes, or is otherwise associated with, the message delivery system, as part of a service provided to the users of the intermediary service.

As noted above, the message delivery system domain provided at PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 can be, but is not limited to: computing systems, and/or combinations of hardware and software systems, providing a sub-network made up of a multiple computing systems under the control of one central security database; and/or all computing systems, software systems, and/or combinations of hardware and software systems sharing a common portion of a Universal Resource Locator (URL), or address, and therefore associated with a common Internet hosting service, e.g., common Internet web servers, and/or similar functionality. As noted above, the message delivery system domain provided at PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 is mapped to Internet Protocol (IP) addresses assigned computing systems, and/or combinations of hardware and software systems, and therefore include data identifying the computing systems, and/or combinations of hardware and software systems.

As noted above, the message delivery system provided at PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 can be, but is not limited to, any data delivery and/or transmission system implemented on a computing system, accessed through one or more servers, accessed through a network, accessed through a cloud, and/or provided through any computing system or by any means, as discussed herein, and/or as known in the art at the time of filing, and/or developed after the time of filing, that has the capability to deliver message data. Specific examples of the message delivery system provided at PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 can be, but are not limited to, any data delivery and/or transmission system implemented on a computing system, accessed through one or more servers, accessed through a network, accessed through a cloud, and/or provided through any computing system or by any means, as discussed herein, and/or as known in the art at the time of filing, and/or developed after the time of filing, that has the capability to deliver message data.

Specific examples of message delivery systems include, but are not limited to: Email systems; multimedia messaging services (MMS), short messaging services (SMS), enhanced messaging services, internet relay chat services, instant messaging services, or any service that uses at least one standardized communication protocol to provide, store, and manage the exchange of messages. One specific illustrative example of a messaging service is Mobile Messaging, which may be a combination of MMS and SMS. Further, other examples of messaging services include Google Chat, Facebook Chat, American Online Instant Messenger, Yahoo! Instant Messenger, etc.

In one embodiment, the message delivery system provided at PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 is a software application and/or web-based system that has the ability to send and/or receive message data.

In one embodiment, the message delivery system provided at PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 is a software application and/or web-based service, which along with a parent computing system, server system, or device, helps users manage message data by providing a centralized interface within an intermediary service to communicate with intended recipients.

As noted above, the effectiveness of the message delivery system of PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 depends upon the message delivery system's ability to provide notification to the user when a message sent on the behalf of the user is subject to a misdirected response message, whether it be a delivery anomaly event notification, such as delivery failure notification, or misdirected reply generated by the intended recipient. In turn, the ability to notify the user of a misdirected response message depends upon having a notification mechanism that does not trigger spam filters.

Currently, however, there is a risk that a message sent from the message delivery system domain will be filtered, or blocked, if it identifies the user notification routing address in the "From" field. Problematically, though, if an address associated with the message delivery system domain is identified in the "From" field, the user will not receive notification of any misdirected response message such as delivery failure messages or misdirected replies. However, as discussed herein, the disclosed embodiments of process 200 for notifying users of misdirected response messages associated with messages sent on the users' behalf by an intermediary service address these shortcomings by providing a mechanism by which a user may be notified of any misdirected response message. As a result, the fields of communication, data transmission, and intermediary services are significantly improved by the implementation of process 200 for notifying users of misdirected response messages associated with messages sent on the users' behalf by an intermediary service.

In one embodiment, once the message delivery system is provided at PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203, process flow proceeds to ASSIGN A USER AN ACCOUNT IN THE MESSAGE DELIVERY SYSTEM OPERATION 205.

In one embodiment, at ASSIGN A USER AN ACCOUNT IN THE MESSAGE DELIVERY SYSTEM OPERATION 205, users of the intermediary service of PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 are assigned an account in the message delivery system of PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203.

In one embodiment, at ASSIGN A USER AN ACCOUNT IN THE MESSAGE DELIVERY SYSTEM OPERATION 205, users of the intermediary service in PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 are assigned an account in the message delivery system by being allocated memory in the message delivery system of PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203.

In one embodiment, once the user is assigned an account at ASSIGN A USER AN ACCOUNT IN THE MESSAGE DELIVERY SYSTEM OPERATION 205, process flow proceeds to OBTAIN A USER NOTIFICATION ROUTING ADDRESS FOR THE USER AND/OR USER ACCOUNT OPERATION 207.

In one embodiment, at OBTAIN A USER NOTIFICATION ROUTING ADDRESS FOR THE USER AND/OR USER ACCOUNT OPERATION 207 a user notification routing address is obtained from the user.

In one embodiment, the user notification routing address of OBTAIN A USER NOTIFICATION ROUTING ADDRESS FOR THE USER AND/OR USER ACCOUNT OPERATION 207 is a routing address associated with the user, such as, but not limited to, an email address or phone number.

In one embodiment, the user notification routing address of OBTAIN A USER NOTIFICATION ROUTING ADDRESS FOR THE USER AND/OR USER ACCOUNT OPERATION 207 is associated with the user outside of the message delivery system.

In one embodiment, the user notification routing address of OBTAIN A USER NOTIFICATION ROUTING ADDRESS FOR THE USER AND/OR USER ACCOUNT OPERATION 207 is a routing address associated with the user, such as, but not limited to, an email address associated with the us; a text message address/number associated with the user; an instant message (IM) address/number associated with the user; and/or a social media account address associated with the user, and/or any other form of communication associated with the user as discussed herein and/or as known in the art at the time of filing, and/or as developed after the time of filing.

In one embodiment, the user notification routing address of OBTAIN A USER NOTIFICATION ROUTING ADDRESS FOR THE USER AND/OR USER ACCOUNT OPERATION 207 is obtained during the process of assigning the user an account in the message delivery system at ASSIGN A USER AN ACCOUNT IN THE MESSAGE DELIVERY SYSTEM OPERATION 205. In one embodiment, the user notification routing address of OBTAIN A USER NOTIFICATION ROUTING ADDRESS FOR THE USER AND/OR USER ACCOUNT OPERATION 207 is automatically generated when the user enters information during the process of assigning the user an account in the message delivery system at ASSIGN A USER AN ACCOUNT IN THE MESSAGE DELIVERY SYSTEM OPERATION 205.

In one embodiment, the user notification routing address of OBTAIN A USER NOTIFICATION ROUTING ADDRESS FOR THE USER AND/OR USER ACCOUNT OPERATION 207 is obtained when the user lists the user notification routing address in an application running on a computing system; via manual input; and/or via any other means and/or mechanism, as discussed herein and/or as known in the art at the time of filing, and/or as developed after the time of filing.

As discussed below, in one embodiment, the user notification routing address of OBTAIN A USER NOTIFICATION ROUTING ADDRESS FOR THE USER AND/OR USER ACCOUNT OPERATION 207 is to be used at PROVIDE THE NOTIFICATION DATA TO THE USER OPERATION 237 to relay misdirected response messages and/or misdirected response message data, such as, but not limited to, delivery anomaly event notifications, delivery anomaly event data, misdirected replies, and/or misdirected reply data, to the user upon occurrence of misdirected response messages being received by the intermediary service involving one or more messages associated with the user sent through the message delivery system, also called original messages.

As discussed below, in one embodiment, the user notification routing address of OBTAIN A USER NOTIFICATION ROUTING ADDRESS FOR THE USER AND/OR USER ACCOUNT OPERATION 207 will be used to provide the user with notification data at PROVIDE THE NOTIFICATION DATA TO THE USER OPERATION 237 via a text message, instant message (IM), email message, and/or any other form of communication as discussed herein and/or as known in the art at the time of filing, and/or as developed after the time of filing.

In one embodiment, once a user notification routing address is obtained at OBTAIN A USER NOTIFICATION ROUTING ADDRESS FOR THE USER AND/OR USER ACCOUNT OPERATION 207, process flow proceeds to GENERATE MESSAGE DATA 209.

In one embodiment, at GENERATE MESSAGE DATA 209 message data, such as email or text message text/body data, is generated through, or provided to, the message delivery system by, or on behalf of, the user.

As discussed below, in one embodiment, the message data generated at GENERATE MESSAGE DATA 209 is to be transmitted via an original message of GENERATE AN ORIGINAL MESSAGE OPERATION 219 to be sent by the message delivery system.

In one embodiment, the message data of GENERATE MESSAGE DATA 209 is machine readable representations of messages.

In one embodiment, the message data of GENERATE MESSAGE DATA 209 is a listing of multiple optical characters and/or patterns, and multiple arrangements of optical characters and/or patterns.

In one embodiment, once message data is at GENERATE MESSAGE DATA 209, process flow proceeds to ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211.

In one embodiment, at ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211, the specific original message to be sent via the message delivery system is assigned a unique sender address, represented by unique "sender address data," that is used to populate the "From" data field of the original message to be sent through the message delivery system.

In one embodiment, the unique sender address assigned to the specific original message at ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 includes unique message identification data that identifies the user and uniquely identifies the specific message.

In one embodiment, the unique message identification data of the unique sender address of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 includes user identification data and individual message identification data.

In one embodiment, the unique message identification data of the unique sender address of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 includes the message delivery system domain data.

In one embodiment, the user identification data of the unique message identification data of the unique sender address of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 identifies the user, and/or a user account within the message delivery system. In one embodiment, the user identification data is selected by the user, or is associated with the user, and can be, but is not limited to, the user's name, the user's initials, or any other data identifying, or associated with, the user, or user account.

In one embodiment, the individual message identification data of the unique message identification data of the unique sender address of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 uniquely identifies the specific message being sent by the user identified by the user identification data.

In one embodiment, the individual message identification data of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 is selected/assigned by the message delivery system, and/or intermediary system, and includes, but is not limited to, alpha-numeric symbols uniquely identifying the specific message sent by the user and being delivered through the message delivery system.

In one embodiment, the individual message identification data of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 includes, but is not limited to, a small monotonically increasing integer suffix. In one embodiment, when the small monotonically increasing integer suffix and the user identification data combine to more than 64 characters, the user identification data is truncated to allow the addition of additional small monotonically increasing integers.

In one embodiment, in addition to unique message identification data, the unique sender address assigned to the specific message of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 includes message delivery system domain data that includes the domain name for the message delivery system associated with the intermediary service.

In one embodiment, the individual message identification data of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 includes, but is not limited to, a small monotonically increasing integer suffix. In one embodiment, when the small monotonically increasing integer suffix and the user identification data combine to 64 characters, a new message delivery system domain is generated. In one embodiment, when the new message delivery system domain is generated, new message delivery system domain data associated with the new message delivery system domain is included in the assigned unique sender address. By generating a new message delivery system domain and including the new message delivery system domain data in the assigned unique sender address, the aesthetics of the unique sender address are preserved. As a result, users and intended recipients can have the most pleasant experience possible.

In one embodiment, the message delivery system domain data of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 is associated with the domain associated with any one of multiple reporting databases.

As discussed below, by including message delivery system domain data in the assigned unique sender address of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 that accurately identifies the domain name for the message delivery system that is actually sending out the message, the messages sent from the message delivery system will not be identified as spam, or other malware, by the currently employed malware blocking systems. Consequently, the unique sender address assigned to the specific messages at ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 are far more likely to result in a successfully delivered message than those that include domain names not associated with the message delivery system.

In one embodiment, once the unique sender address is assigned to the generated message data at ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211, process flow proceeds to ASSOCIATE AT LEAST A PORTION OF THE GENERATED MESSAGE DATA WITH THE UNIQUE SENDER ADDRESS DATA OPERATION 213.

In one embodiment, at ASSOCIATE AT LEAST A PORTION OF THE GENERATED MESSAGE DATA WITH THE UNIQUE SENDER ADDRESS DATA OPERATION 213 at least a portion of the generated message data of GENERATE MESSAGE DATA 209 to be included in the original message is associated with the unique sender address data of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211, and in particular, with the unique message identification data included in the unique sender address data.

In one embodiment, at least a portion of the generated message data and at least the unique message identification data of the unique sender address are correlated and stored at ASSOCIATE AT LEAST A PORTION OF THE GENERATED MESSAGE DATA WITH THE UNIQUE SENDER ADDRESS DATA OPERATION 213. Consequently, at least a portion of the generated message data can be identified and accessed using the individual message identifier data at any time after the message is transmitted to the intended recipient by the message delivery system.

In one embodiment, once at least a portion of the generated message data to be included in the original message is associated with the unique sender address data, and in particular, with the unique message identification data included in the unique sender address data at ASSOCIATE AT LEAST A PORTION OF THE GENERATED MESSAGE DATA WITH THE UNIQUE SENDER ADDRESS DATA OPERATION 213, process flow proceeds to ASSOCIATE AT LEAST A PORTION OF THE UNIQUE MESSAGE IDENTIFICATION DATA WITH THE USER NOTIFICATION ROUTING ADDRESS FOR THE USER OPERATION 215.

In one embodiment, at ASSOCIATE AT LEAST A PORTION OF THE UNIQUE MESSAGE IDENTIFICATION DATA WITH THE USER NOTIFICATION ROUTING ADDRESS FOR THE USER OPERATION 215, at least a portion of the unique message identification data of the unique sender address of ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211 assigned to the message to be sent through the message delivery system is mapped to the user notification routing address of OBTAIN A USER NOTIFICATION ROUTING ADDRESS FOR THE USER AND/OR USER ACCOUNT OPERATION 207 associated with the user sending the message, or on whose behalf the message is being sent.

In one embodiment, at ASSOCIATE AT LEAST A PORTION OF THE UNIQUE MESSAGE IDENTIFICATION DATA WITH THE USER NOTIFICATION ROUTING ADDRESS FOR THE USER OPERATION 215 each of the multiple optical characters and/or patterns, and multiple arrangements of optical characters and/or patterns, that represent at least a portion of the unique message identification data is mapped to the user notification routing address.

In one embodiment, at ASSOCIATE AT LEAST A PORTION OF THE UNIQUE MESSAGE IDENTIFICATION DATA WITH THE USER NOTIFICATION ROUTING ADDRESS FOR THE USER OPERATION 215 all the unique message identification data of the unique sender address assigned to the message, including the user identification data and the individual message identification data, is mapped to the user notification routing address. Consequently, as discussed below, any response message sent to the "From" field of the message, i.e., the unique sender address assigned to the message, will be first delivered to the message system domain indicated by the message delivery system domain data of the unique sender address.

In one embodiment, at ASSOCIATE AT LEAST A PORTION OF THE UNIQUE MESSAGE IDENTIFICATION DATA WITH THE USER NOTIFICATION ROUTING ADDRESS FOR THE USER OPERATION 215 only the user identification data of the unique message identification data of the unique sender address assigned to the message is mapped to the user notification routing address. Consequently, as discussed above, any response message sent to the "From" field of the message, i.e., the unique sender address assigned to the message, will first be delivered to the message system domain indicated by the message delivery system domain data of the unique sender address.

In one embodiment, once at least a portion of the unique message identification data of the unique sender address assigned to the message to be sent through the message delivery system is mapped to the user notification routing address associated with the user sending the message, or on whose behalf the message is being sent at ASSOCIATE AT LEAST A PORTION OF THE UNIQUE MESSAGE IDENTIFICATION DATA WITH THE USER NOTIFICATION ROUTING ADDRESS FOR THE USER OPERATION 215, process flow proceeds to DETERMINE AN INTENDED RECIPIENT ROUTING ADDRESS ASSOCIATED WITH THE GENERATED MESSAGE DATA OPERATION 217.

In one embodiment, at DETERMINE AN INTENDED RECIPIENT ROUTING ADDRESS ASSOCIATED WITH THE GENERATED MESSAGE DATA OPERATION 217 an intended recipient for the original message is determined and intended recipient data to be used to populate the "To" field of the original message is generated and/or obtained.

In one embodiment, the intended recipient data of DETERMINE AN INTENDED RECIPIENT ROUTING ADDRESS ASSOCIATED WITH THE GENERATED MESSAGE DATA OPERATION 217 is contact information for the intended recipient, such as an email address associated with the intended recipient; a text message address/number associated with the intended recipient; an instant message (IM) address/number associated with the intended recipient; a social media account address associated with the intended recipient; and/or any other contact information as discussed herein and/or as known in the art at the time of filing, and/or as developed after the time of filing In one embodiment, the intended recipient routing address of DETERMINE AN INTENDED RECIPIENT ROUTING ADDRESS ASSOCIATED WITH THE GENERATED MESSAGE DATA OPERATION 217 will be used to provide the intended recipient with message data via a text message, instant message (IM), email message, and/or another other form of communication as discussed herein and/or as known in the art at the time of filing, and/or as developed after the time of filing.

In one embodiment, once at DETERMINE AN INTENDED RECIPIENT ROUTING ADDRESS ASSOCIATED WITH THE GENERATED MESSAGE DATA OPERATION 217 an intended recipient for the original message is determined and intended recipient data to be used to populate the "To" field of the original message is generated and/or obtained at DETERMINE AN INTENDED RECIPIENT ROUTING ADDRESS ASSOCIATED WITH THE GENERATED MESSAGE DATA OPERATION 217, process flow proceeds to GENERATE AN ORIGINAL MESSAGE OPERATION 219.

In one embodiment, at GENERATE AN ORIGINAL MESSAGE OPERATION 219, an original message is generated through the message delivery system of PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 associated with the intermediary system on behalf of the user.

In one embodiment, the original message of GENERATE AN ORIGINAL MESSAGE OPERATION 219 includes a "To" field populated by the intended recipient data of DETERMINE AN INTENDED RECIPIENT ROUTING ADDRESS ASSOCIATED WITH THE GENERATED MESSAGE DATA OPERATION 217, a "From" field populated, according to one embodiment, with unique sender address data representing the unique sender address assigned to the message at ASSIGN UNIQUE SENDER ADDRESS DATA TO THE GENERATED MESSAGE DATA, INCLUDING THE UNIQUE MESSAGE IDENTIFICATION DATA AND MESSAGE DELIVERY SYSTEM DOMAIN DATA REPRESENTING THE MESSAGE DELIVERY SYSTEM DOMAIN OPERATION 211.

In one embodiment, the original message of GENERATE AN ORIGINAL MESSAGE OPERATION 219 includes a "Reply To" field which, in one embodiment, can include the user routing address data, representing the user routing address provided by the user. In one embodiment, the original message of GENERATE AN ORIGINAL MESSAGE OPERATION 219 also includes the generated message data of GENERATE MESSAGE DATA 209.

In one embodiment, once an original message is generated through the message delivery system of PROVIDE A MESSAGE DELIVERY SYSTEM, INCLUDING A MESSAGE DELIVERY SYSTEM DOMAIN, ASSOCIATED WITH AN INTERMEDIARY SERVICE OPERATION 203 associated with the intermediary system on behalf of the at GENERATE AN ORIGINAL MESSAGE OPERATION 219, process flow proceeds to SEND THE ORIGINAL MESSAGE TO THE INTENDED RECIPIENT WITH THE UNIQUE SENDER ADDRESS DATA IN THE FROM FIELD OPERATION 221.

In one embodiment, at SEND THE ORIGINAL MESSAGE TO THE INTENDED RECIPIENT WITH THE UNIQUE SENDER ADDRESS DATA IN THE FROM FIELD OPERATION 221 the original message of GENERATE AN ORIGINAL MESSAGE OPERATION 219 is sent, transmitted, or otherwise transferred to the intended recipient indicated by intended recipient data of DETERMINE AN INTENDED RECIPIENT ROUTING ADDRESS ASSOCIATED WITH THE GENERATED MESSAGE DATA OPERATION 217.

In one embodiment, once the original message of is sent, transmitted, or otherwise transferred to the intended recipient indicated by intended recipient data at SEND THE ORIGINAL MESSAGE TO THE INTENDED RECIPIENT WITH THE UNIQUE SENDER ADDRESS DATA IN THE FROM FIELD OPERATION 221, process flow proceeds to MISDIRECTED RESPONSE MESSAGE? OPERATION 223.

In one embodiment, if the generated message of SEND THE ORIGINAL MESSAGE TO THE INTENDED RECIPIENT WITH THE UNIQUE SENDER ADDRESS DATA IN THE FROM FIELD OPERATION 221 is properly received by the intended recipient indicated by intended recipient data and the intended recipient does not send a reply message to the "From" field of the message, i.e., no misdirected response message is generated, then no further action is required and at MISDIRECTED RESPONSE MESSAGE? OPERATION 223 a "NO" determination is made and process flow proceeds directly to EXIT OPERATION 260 to await new data.

However, if the generated message of SEND THE ORIGINAL MESSAGE TO THE INTENDED RECIPIENT WITH THE UNIQUE SENDER ADDRESS DATA IN THE FROM FIELD OPERATION 221 is not properly received by the intended recipient indicated by intended recipient data, i.e., there is a message delivery failure, or the intended recipient does send a reply message to the "From" field of the message, i.e., a misdirected response message is generated, then, in one embodiment, a "YES" determination is made at MISDIRECTED RESPONSE MESSAGE? OPERATION 223 and process flow proceeds through GO TO OPERATION 230 OF FIG. 2B OPERATION 225 of FIG. 2A to FROM OPERATION 225 OF FIG. 2A OPERATION 230 of FIG. 2B and RECEIVE MISDIRECTED RESPONSE MESSAGE DATA VIA THE UNIQUE SENDER ADDRESS OPERATION 231.

In one embodiment, at RECEIVE MISDIRECTED RESPONSE MESSAGE DATA VIA THE UNIQUE SENDER ADDRESS OPERATION 231 misdirected response message data representing the misdirected response message sent to the "From" field of the original message, i.e., the unique sender address assigned to the original message, is delivered to the message system domain indicated by the message delivery system domain data of the unique sender address, i.e., the domain associated with the message delivery system and/or the intermediary service.

In one embodiment, the misdirected response message data of RECEIVE MISDIRECTED RESPONSE MESSAGE DATA VIA THE UNIQUE SENDER ADDRESS OPERATION 231 can include, but is not limited to, delivery anomaly event notification data such as message delivery failure error data and/or bounced message notification data; and/or misdirected reply data from the intended recipient.

In one embodiment, the misdirected response message data of RECEIVE MISDIRECTED RESPONSE MESSAGE DATA VIA THE UNIQUE SENDER ADDRESS OPERATION 231 can include, but is not limited to, the following misdirected response message types: a misdirected response message indicating the recipient has exceeded their mailbox limit; a misdirected response message indicating the delivery directory on the virtual server has exceeded its limit; a misdirected response message indicating there is not enough disk space on the delivery server; a misdirected response message indicating a classic temporary problem, e.g., the administrator has frozen the queue; a misdirected response message indicating intermittent network connection; a misdirected response message indicating the server has not yet responded; a misdirected response message indicating the server started to deliver the message but then the connection was broken; a misdirected response message indicating too many hops; a misdirected response message indicating a problem with a timeout; a misdirected response message indicating a DNS problem; a misdirected response message indicating a multi-language situation; a misdirected response message indicating a problem with intended recipient address; a misdirected response message indicating other problems with contacts; a misdirected response message indicating two objects have the same address; a misdirected response message indicating destination mailbox address invalid; a misdirected response message indicating a problem with homeMDB or msExchHomeServerName; a misdirected response message indicating a problem with sender's mail attribute; a misdirected response message indicating a problem with the large size of the email; a misdirected response message indicating the message is too large; a misdirected response message indicating mail system full; a misdirected response message indicating multiple Virtual Servers are using the same IP address and port; a misdirected response message indicating no answer from host; a misdirected response message indicating a bad connection; a misdirected response message indicating a routing server failure; a misdirected response message indicating no available route; a misdirected response message indicating delivery time-out; a misdirected response message indicating the message is taking too long to be delivered; a misdirected response message indicating an underlying SMTP 500 error; a misdirected response message indicating more than 5,000 recipients; a misdirected response message indicating the wrong protocol version; a misdirected response message indicating more than 250 attachments; a misdirected response message indicating a permissions problem; a misdirected response message indicating the sender is not allowed to email the account; a misdirected response message indicating that the distribution list cannot expand and so is unable to deliver its messages; a misdirected response message indicating extra security features not supported; a misdirected response message indicating a cryptographic failure; a misdirected response message indicating a certificate problem; a misdirected response message indicating message integrity problem; and/or any other a misdirected response message discussed herein, and/or as known in the art at the time of filing, and/or as employed after the time of filing.

In one embodiment, once misdirected response message data representing the misdirected response message sent to the "From" field of the original message, i.e., the unique sender address assigned to the message, is delivered to the message delivery system domain indicated by the message delivery system domain data of the unique sender address at RECEIVE MISDIRECTED RESPONSE MESSAGE DATA VIA THE UNIQUE SENDER ADDRESS OPERATION 231, process flow proceeds to ANALYZE/MAP AT LEAST A PORTION OF THE UNIQUE MESSAGE IDENTIFICATION DATA OF THE UNIQUE SENDER ADDRESS DATA TO THE USER NOTIFICATION ROUTING ADDRESS DATA OPERATION 233.

In one embodiment, at ANALYZE/MAP AT LEAST A PORTION OF THE UNIQUE MESSAGE IDENTIFICATION DATA OF THE UNIQUE SENDER ADDRESS DATA TO THE USER NOTIFICATION ROUTING ADDRESS DATA OPERATION 233, the unique sender address is automatically analyzed by the intermediary service and/or message delivery system associated with the intermediary service to identify at least a portion of unique message identification data in the sender and at least a portion of the unique message identification data that is mapped to the user notification routing address.

In one embodiment, at ANALYZE/MAP AT LEAST A PORTION OF THE UNIQUE MESSAGE IDENTIFICATION DATA OF THE UNIQUE SENDER ADDRESS DATA TO THE USER NOTIFICATION ROUTING ADDRESS DATA OPERATION 233, the unique sender address is automatically analyzed by the intermediary service and/or message delivery system associated with the intermediary service to identify the entire unique message identification data in the unique sender address and the unique message identification data is mapped to the user notification routing address using the mapping data of ASSOCIATE AT LEAST A PORTION OF THE UNIQUE MESSAGE IDENTIFICATION DATA WITH THE USER NOTIFICATION ROUTING ADDRESS FOR THE USER OPERATION 215.

In one embodiment, at ANALYZE/MAP AT LEAST A PORTION OF THE UNIQUE MESSAGE IDENTIFICATION DATA OF THE UNIQUE SENDER ADDRESS DATA TO THE USER NOTIFICATION ROUTING ADDRESS DATA OPERATION 233 the unique sender address is automatically analyzed by the intermediary service and/or message delivery system associated with the intermediary service to identify just the user identification data in the unique sender address and the user identification data is mapped to the user notification routing address using the mapping data of ASSOCIATE AT LEAST A PORTION OF THE UNIQUE MESSAGE IDENTIFICATION DATA WITH THE USER NOTIFICATION ROUTING ADDRESS FOR THE USER OPERATION 215.

In one embodiment, once at least a portion of the unique message identification data is mapped to the user notification routing address at ANALYZE/MAP AT LEAST A PORTION OF THE UNIQUE MESSAGE IDENTIFICATION DATA OF THE UNIQUE SENDER ADDRESS DATA TO THE USER NOTIFICATION ROUTING ADDRESS DATA OPERATION 233, process flow proceeds to GENERATE NOTIFICATION DATA OPERATION 235.

In one embodiment, at GENERATE NOTIFICATION DATA OPERATION 235 notification data representing a notification of the misdirected response message, and/or any portion of the misdirected response message data, and/or any portion of the original message data included in the original message, is generated.

In one embodiment, the notification data of at GENERATE NOTIFICATION DATA OPERATION 235 includes human-readable representations of the misdirected response message data. In one embodiment, the notification data of GENERATE NOTIFICATION DATA OPERATION 235 includes data informing the user of the existence of the misdirected response message data, and/or delivery anomaly event, and/or misdirected rely message and is in the form of one or more alert/notification mechanisms.

In one embodiment, once notification data representing a notification of the misdirected response message, and/or any portion of the misdirected response message data, and/or any portion of the original message data included in the original message, is generated at GENERATE NOTIFICATION DATA OPERATION 235, process flow proceeds to PROVIDE THE NOTIFICATION DATA TO THE USER OPERATION 237.

In one embodiment, at PROVIDE THE NOTIFICATION DATA TO THE USER OPERATION 237, the notification data of GENERATE NOTIFICATION DATA OPERATION 235 is provided to the user by the message delivery system and/or the intermediary service using the user notification routing address of OBTAIN A USER NOTIFICATION ROUTING ADDRESS FOR THE USER AND/OR USER ACCOUNT OPERATION 207.

For instance, as an illustrative example, in one embodiment, at PROVIDE THE NOTIFICATION DATA TO THE USER OPERATION 237, the existence of the misdirected response message data, and/or delivery anomaly event, and/or misdirected rely message is brought to the user's attention via a text message, email message, pop-up graphic, and/or phone call.

In one embodiment, once the notification data is provided to the user using the user notification routing address at PROVIDE THE NOTIFICATION DATA TO THE USER OPERATION 237, process flow proceeds to PROVIDE THE USER ACCESS TO AT LEAST A PORTION OF THE RESPONSE DATA AND/OR AT LEAST A PORTION OF THE GENERATED MESSAGE DATA OPERATION 239

In one embodiment, at PROVIDE THE USER ACCESS TO AT LEAST A PORTION OF THE RESPONSE DATA AND/OR AT LEAST A PORTION OF THE GENERATED MESSAGE DATA OPERATION 239 the user is provided access to the portion of the message data associated with the unique message identification data at ASSOCIATE AT LEAST A PORTION OF THE GENERATED MESSAGE DATA WITH THE UNIQUE SENDER ADDRESS DATA OPERATION 213.

In one embodiment, at PROVIDE THE USER ACCESS TO AT LEAST A PORTION OF THE RESPONSE DATA AND/OR AT LEAST A PORTION OF THE GENERATED MESSAGE DATA OPERATION 239, the notification data relayed to the user by the message delivery system and/or the intermediary service using the user notification routing address of PROVIDE THE NOTIFICATION DATA TO THE USER OPERATION 237 includes instructions and/or data, such as the individual message identification data associated with the original message, needed to access at least a portion of the generated message data correlated to the individual message identification data.

In one embodiment, at PROVIDE THE USER ACCESS TO AT LEAST A PORTION OF THE MISDIRECTED RESPONSE MESSAGE DATA AND/OR AT LEAST A PORTION OF THE GENERATED MESSAGE DATA OPERATION 239 the user is provided with an interface and/or a link to an interface that allows the user to access at least a portion of the misdirected response message data and/or at least a portion of the message data included in the original message.

Consequently, in one embodiment, the user is provided notification of any delivery anomaly event and/or misdirected reply at the user designated user notification routing address and is provided access to at least a portion of the original message data. This allows the user to not only be made aware of the delivery anomaly event and/or misdirected reply, but also allows the user to determine the content of the original message. In this way, the user is provided all the information necessary to correctly assess the situation and take the appropriate corrective action.

In one embodiment, once the user is provided access to at least a portion of the misdirected response message data and/or at least a portion of the message data associated with the unique message identification data at PROVIDE THE USER ACCESS TO AT LEAST A PORTION OF THE RESPONSE DATA AND/OR AT LEAST A PORTION OF THE GENERATED MESSAGE DATA OPERATION 239, process flow proceeds to GO TO OPERATION 260 OF FIG. 2A OPERATION 241

In one embodiment, process flow proceeds through GO TO OPERATION 260 OF FIG. 2A OPERATION 241 of FIG. 2B to EXIT OPERATION 260 of FIG. 2A.

In one embodiment, at EXIT OPERATION 260, process 200 for notifying users of misdirected response messages associated with messages sent on the users' behalf by an intermediary service is exited to await new data.

Using embodiments of process 200 for notifying users of misdirected response messages associated with messages sent on the users' behalf by an intermediary service, users of intermediary services are automatically notified of delivery anomaly event notifications, misdirected replies, and any other responses made to the original message sent to the "From" field of the original message, using the unique sender address data in the "From" field of the message. Consequently, using embodiments of process 200 for notifying users of misdirected response messages associated with messages sent on the users' behalf by an intermediary service, a solution is provided to the long standing problem of lost delivery anomaly event notifications and misdirected replies. As a result, using embodiments of process 200 for notifying users of misdirected response messages associated with messages sent on the users' behalf by an intermediary service, the intermediary service can efficiently and effectively deliver more, if not all, of the message data generated through the message delivery system; can provide the user with a more useful intermediary service; and can provide the user with a more reliable, effective, and efficient user experience.

The various embodiments of process 200 for notifying users of misdirected response messages associated with messages sent on the users' behalf by an intermediary service and their associated benefits therefore improve the technical fields of intermediary service implementation, message delivery, communications, and data processing by ensuring that delivery anomaly event notifications, automated error messages, and misdirected replies are not lost in the message delivery systems associated with the intermediary service. Furthermore, by increasing the reliability of message delivery, the intermediary service users will have more confidence in, and will be more likely to continue using, the intermediary service.

In addition, by providing delivery anomaly event notifications and/or misdirected response messages to the correct, and most interested parties, embodiments of process 200 for notifying users of misdirected response messages associated with messages sent on the users' behalf by an intermediary service assist users in actively using an intermediary service.

Therefore, implementations of embodiments of process 200 for notifying users of misdirected response messages associated with messages sent on the users' behalf by an intermediary service also represent a significant improvement to the field of user experience, particularly by allowing for the more efficient allocation of human and non-human resources. For example, by providing automatic delivery anomaly event notifications and misdirected response messages to the user, users are required to spend less time and energy managing their communications with intended recipients.

As a result, using implementations of embodiments of process 200 for notifying users of misdirected response messages associated with messages sent on the users' behalf by an intermediary service, the fields of intermediary services, message delivery, communications, and data processing are significantly improved.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for notifying users of misdirected response message data, the method for notifying users of misdirected response messages comprising:
   providing a message delivery system, including a message delivery system domain, associated with an intermediary service;
   originating, at the intermediary service, a first message generated by the intermediary service on behalf of a user, the first message originating at the intermediary service including an original first message body generated within the intermediary service;
   assigning, by the message delivery system, a unique sender address of the intermediary service to a "from" field of the originated first message, including a unique message identification and a message delivery system domain, wherein the unique message identifier is a unique message identifier including a monotonically increasing integer suffix;
   associating the originated first message with the unique sender address and storing the result as a combined first message;
   associating at least a portion of the unique message identification with a user notification routing address of the user;
   determining an intended recipient routing address, the intended recipient routing address representing an intended recipient of the originated first message;
   sending, by the intermediary service, the originated first message to the intended recipient with the unique sender address of the intermediary service in the from field and the user notification address in a reply-to field;
   receiving, at the intermediary service, a misdirected response message via the unique sender address of the intermediary service, the misdirected response message indicating that delivery of the originated first message to the intended recipient failed;
   mapping, at the intermediary service that sent the message to the intended recipient, at least a portion of the unique message identification of the unique sender address to the user notification routing address;
   generating, by the intermediary service, a second message, the second message including at least a portion of the first message body of the stored combined first message; and
   providing the second message to the user via the user notification routing address.

2. The method for notifying users of misdirected response message data of claim 1 wherein the message delivery system is an email delivery system.

3. The method for notifying users of misdirected response message data of claim 1 wherein the message delivery system is a mobile messaging system.

4. The method for notifying users of misdirected response message data of claim 1 wherein the message delivery system is a message delivery system selected from the group of message delivery systems consisting of:
   a computing system implemented message delivery system;
   a network accessed message delivery system;
   a web-based intermediary message delivery system; or
   a cloud-based intermediary message delivery system.

5. The method for notifying users of misdirected response message data of claim 1 wherein the unique message identifier is a unique message identifier including:
   a user alias unique to each user notification routing address; and
   a symbol or combination of symbols.

6. The method notifying users of misdirected response message data of claim 1 wherein the source of the unique message identifier is defined at least in part by the user.

7. The method for notifying users of misdirected response message data of claim 1 wherein the unique message identifier is a 64 character unique message identifier including:
   a user alias unique to each user notification routing address truncated to 62 characters or less;
   a period; and
   a symbol or combination of symbols.

8. The method for notifying users of misdirected response message data of claim 1 wherein the misdirected response message data is misdirected response message data consisting of text message error notification.

9. The method for notifying users of misdirected response message data of claim 1 wherein notifying the user that misdirected response message data has been received includes using one or more notification mechanisms selected from the group of notification mechanisms consisting of:
   a pop-up display;
   a graphic display;
   a text message;
   an e-mail message;
   a phone call or message;
   an instant message; or
   a printed message.

10. A method for notifying users of a delivery anomaly event, the method for notifying users of a delivery anomaly event comprising:
   providing a message delivery system, including a message delivery system domain, associated with an intermediary service;
   originating, at the intermediary service, a first message generated by the intermediary service on behalf of a user, the first message originating at the intermediary service including an original first message body generated within the intermediary service;
   assigning, at the intermediary service, a unique sender address of the intermediary service to a "from" field of the originated first message, including a unique message identification and a message delivery system domain, wherein the unique message identifier is a unique message identifier including a monotonically increasing integer suffix;
   associating the originated first message with the unique sender address and storing the result as a combined first message;
   associating at least a portion of the unique message identification with a user notification routing address of the user;
   determining an intended recipient routing address, the intended recipient routing address representing an intended recipient of the originated first message;
   sending, by the intermediary service, the originated first message to the intended recipient with the unique sender address of the intermediary service in the from field and the user notification address in a reply-to field;
   receiving, by the intermediary service, a delivery anomaly event message via the unique sender address, the delivery anomaly message indicating that delivery of the originated first message to the intended recipient failed;

mapping, at the intermediary service that sent the originated first message to the intended recipient, at least a portion of the unique message identification of the unique sender address to the user notification routing address;

generating, by the intermediary service, a second message, the second message including at least a portion of the first message body of the stored combined first message; and providing the second message to the user via the user notification routing address.

11. The method for notifying users of a delivery anomaly event of claim 10 wherein the message delivery system is an email delivery system.

12. The method for notifying users of a delivery anomaly event of claim 10 wherein the message delivery system is a mobile messaging system.

13. The method for notifying users of a delivery anomaly event of claim 10 wherein the message delivery system is a message delivery system selected from the group of message delivery systems consisting of:
 a computing system implemented message delivery system;
 a network accessed message delivery system;
 a web-based intermediary message delivery system; or
 a cloud-based intermediary message delivery system.

14. The method for notifying users of a delivery anomaly event of claim 10 wherein the unique message identifier is a unique message identifier including:
 a user alias unique to each user notification routing address; and
 a symbol or combination of symbols.

15. The method for notifying users of a delivery anomaly event of claim 10 wherein the source of the unique message identifier is defined at least in part by the user.

16. The method for notifying users of a delivery anomaly event of claim 10 wherein the unique message identifier is a 64 character unique message identifier including:
 a user alias unique to each user notification routing address truncated to 62 characters or less;
 a period; and
 a symbol or combination of symbols.

17. The method for notifying users of a delivery anomaly event of claim 10 wherein the delivery anomaly event data is delivery anomaly event data consisting of text message error notification.

18. The method for notifying users of a delivery anomaly event of claim 10 wherein notifying the user that delivery anomaly event data has been received includes using one or more notification mechanisms selected from the group of notification mechanisms consisting of:
 a pop-up display;
 a graphic display;
 a text message;
 an e-mail message;
 a phone call or message;
 an instant message; or
 a printed message.

19. A method for notifying users of a misdirected reply message, the method for notifying users of a misdirected reply message comprising:
 providing a message delivery system, including a message delivery system domain, associated with an intermediary service;
 originating, at the intermediary service, a first message generated by the intermediary service on behalf of a user, the first message originating at the intermediary service including an original first message body generated within the intermediary service;
 assigning, by the message delivery system, a unique sender address to a "from" field of the originated first message, including a unique message identification and message delivery system domain, wherein the unique message identifier is a unique message identifier including a monotonically increasing integer suffix;
 associating the originated first message with the unique sender address and storing the result as a combined first message;
 associating at least a portion of the unique message identification with the user notification routing address of the user;
 determining an intended recipient routing address, the intended recipient routing address representing an intended recipient of the originated first message;
 sending, by the intermediary service, the originated first message to the intended recipient with the unique sender address of the intermediary service in the from field and the user notification address in a reply-to field;
 receiving, at the intermediary service, a misdirected response message via the unique sender address of the intermediary service, the misdirected response message indicating that delivery of the originated first message to the intended recipient failed;
 mapping, at the intermediary service that sent the message to the intended recipient, at least a portion of the unique message identification of the unique sender address to the user notification routing address;
 generating, by the intermediary service, a second message, the second message including at least a portion of the first message body of the stored combined first message; and
 providing the second message to the user via the user notification routing address.

20. The method for notifying users of a misdirected reply message of claim 19 wherein the message delivery system is an email delivery system.

21. The method for notifying users of a misdirected reply message of claim 19 wherein the message delivery system is a mobile messaging system.

22. The method for notifying users of a misdirected reply message of claim 19 wherein the message delivery system is a message delivery system selected from the group of message delivery systems consisting of:
 a computing system implemented message delivery system;
 a network accessed message delivery system;
 a web-based intermediary message delivery system; or
 a cloud-based intermediary message delivery system.

23. The method for notifying users of a misdirected reply message of claim 19 wherein the unique message identifier is a unique message identifier including:
 a user alias unique to each user notification routing address; and
 a symbol or combination of symbols.

24. The method for notifying users of a misdirected reply message of claim 19 wherein the source of the unique message identifier is defined at least in part by the user.

25. The method for notifying users of a misdirected reply message of claim 19 wherein the unique message identifier is a 64 character unique message identifier including:
 a user alias unique to each user notification routing address truncated to 62 characters or less;
 a period; and
 a symbol or combination of symbols.

26. The method for notifying users of a misdirected reply message of claim 19 wherein the misdirected reply message data is misdirected reply message data consisting of text message error notification.

27. The method for notifying users of a misdirected reply message of claim 19 wherein notifying the user that misdirected reply message data has been received includes using one or more notification mechanisms selected from the group of notification mechanisms consisting of:
- a pop-up display;
- a graphic display;
- a text message;
- an e-mail message;
- a phone call or message;
- an instant message; or
- a printed message.

\* \* \* \* \*